(12) United States Patent
Sagar et al.

(10) Patent No.: US 8,805,924 B2
(45) Date of Patent: Aug. 12, 2014

(54) OPTIMISTIC CONCURRENCY UTILIZING DISTRIBUTED CONSTRAINT ENFORCEMENT

(75) Inventors: Akash J. Sagar, Redmond, WA (US);
Richard Y. Chung, Bothell, WA (US);
Raymond E. Endres, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1067 days.

(21) Appl. No.: 12/787,396

(22) Filed: May 26, 2010

(65) Prior Publication Data

US 2011/0295929 A1 Dec. 1, 2011

(51) Int. Cl.
*G06F 15/16* (2006.01)
(52) U.S. Cl.
USPC .......................... 709/203; 709/224; 709/229
(58) Field of Classification Search
None
See application file for complete search history.

(56) References Cited

U.S. PATENT DOCUMENTS

| | | | |
|---|---|---|---|
| 2003/0167287 A1* | 9/2003 | Forster | 707/203 |
| 2004/0122870 A1 | 6/2004 | Park et al. | |
| 2005/0027755 A1 | 2/2005 | Shah et al. | |
| 2006/0031379 A1* | 2/2006 | Kasriel et al. | 709/213 |
| 2006/0215569 A1 | 9/2006 | Khosravy et al. | |
| 2007/0106683 A1 | 5/2007 | Grabelsky et al. | |
| 2008/0263103 A1* | 10/2008 | McGregor et al. | 707/200 |
| 2009/0287762 A1 | 11/2009 | Gopal et al. | |

OTHER PUBLICATIONS

"Administrators Guide", Retrieved at << http://www.redhat.com/docs/manuals/dir-server/pdf/ds71admin.pdf >>, May 2005, pp. 1-652.
Liamca., "How to Synchronize Multiple Geographically Distributed SQL Server Databases using SQL Azure Data Sync", Retrieved at << http://blogs.msdn.com/sync/archive/2009/12/14/how-to-synchronize-multiple-geographically-distributed-sql-server-databases-using-sql-azure-data-sync.aspx >>, Dec. 14, 2009, pp. 1-2.
"Microsoft Sync Framework", Retrieved at << http://download.microsoft.com/download/a/6/d/a6d6f869-55d3-4cfc-947a-ce2f2c12a643/Microsoft%20Sync%20Framework%20Datasheet.pdf >>, pp. 2.
"FeedSync", Retrieve at << http://dev.live.com/feedsync/default.aspx >>, Retrieved Date: Mar. 26, 2010, pp. 1-2.

* cited by examiner

*Primary Examiner* — Scott Christensen
(74) *Attorney, Agent, or Firm* — Bryan Webster; Andrew Sanders; Micky Minhas

(57) ABSTRACT

Optimistic concurrency is effectuated to manage constraints in a synchronization environment at multiple computing device endpoints in a consistent fashion without utilizing concentrated centralized constraint logic. Implemented data synchronization constraints that identify false violation scenarios may be automatically resolved without user intervention by using an etag system directed by a master component to assist computing device endpoints to maintain data synchronization among them. Data entries defining each file hierarchy component to be synced are generated and shared with the master component and each computing device endpoint in a synchronization environment. Individual computing device endpoints can use the data entries generated locally with those generated by other computing device endpoints to locally resolve identified false violation scenarios.

19 Claims, 15 Drawing Sheets

515

```
<DATA ENTRY>
<SX:SYNC ID = "ID3" ; ETAG = "1">
<ENCLOSURE LENGTH = 15>
<PATH = "A">
<HISTORY: NAME = "E" ; HASH = A06 ; BY = "SUE"...>
```

```
<DATA ENTRY>
<SX:SYNC ID = "ID4" ; ETAG = "0">
<ENCLOSURE LENGTH = 20>
<PATH = "A">
<HISTORY: NAME = "E" ; HASH = B256 ; BY = "JOE"...>
```

```
<DATA ENTRY>
<SX:CONFLICT>    530

<SX:SYNC ID = "ID3" ; ETAG = "1">

<ENCLOSURE LENGTH = 15>

<PATH = "A">                                535

<HISTORY: NAME = "B" ; HASH = A06 ; BY = "SUE"...>

<SX:CONFLICT END>

<SX:SYNC ID = "ID4" ; ETAG = "0">

<ENCLOSURE LENGTH = 20>
                                            540
<PATH = "A">

<HISTORY: NAME = "B" ; HASH = B256 ; BY = "JOE"...>
```

FIG. 5E

OPTIMISTIC CONCURRENCY UTILIZING DISTRIBUTED CONSTRAINT ENFORCEMENT

BACKGROUND

A computing device user today often has access to two or more computing devices, e.g., desktop computer, laptop computer, mainframe computer, personal digital assistant (PDA), smart phone, etc., and the user often shares files, e.g., text documents, images, videos, etc., among their various computing devices. Moreover, two or more computing device users can share files between each of their computing devices; e.g., two or more users may collaborate on one or more files for a work or school project, two or more users can share picture images, etc.

Users can synchronize, or sync, the folders and files in one or more file hierarchies stored on or otherwise accessible to their computing devices to maintain the same versions of files on each of the computing devices. Constraints designed into a synchronization system, e.g., no duplicative file names, etc., while instigated to help maintain synchronization order among member computing devices of a synchronization environment can be problematic to address in a timely and user-friendly manner.

For example, constraint management can generate false violation scenarios, i.e., seeming violation scenarios that do not represent true issues, that may be nonsensical for users and, thus, confusing and even difficult for users to attempt to resolve. Moreover, imposing constraint management in a synchronization environment master component, e.g., cloud, can limit the flexibility of the environment and require computing power at a central node at the expense of other tasks. Further, automated resolution of constraints can generate its own additional violations that, under certain conditions, can spiral into an unmanageable situation. Thus it is desirable to support a robust synchronization environment that can manage one or more constraints in an effective manner.

SUMMARY

This summary is provided to introduce a selection of concepts in a simplified form which are further described below in the Detailed Description. This summary is not intended to identify key or essential features of the claimed subject matter, nor is it intended to be used as an aid in determining the scope of the claimed subject matter.

Embodiments discussed herein include systems and methodology for enabling automatic and localized resolution of some conflicts, e.g., incompatibilities or incongruous elements, fabricated by a violation of one or more synchronization environment constraints.

In embodiments tags, also referred to herein as etags, are used to effectively keep track of the syncs from various member computing devices of a synchronization environment.

In embodiments a member computing device of a synchronization environment can sync with the central node of its synchronization environment by receiving downloaded data entries that contain meta data that identifies the various files and folders of a file hierarchy. In embodiments the member computing device compares downloaded data entries with stored data entries that contain meta data that identifies the various files and folders of a file hierarchy stored on or otherwise accessible to the member computing device. In embodiments the member computing device identifies a violation of an established synchronization environment constraint when a downloaded data entry and a stored data entry have a relationship, e.g., one or more fields of the respective data entries match.

In embodiments the member computing device can locally and automatically recognize and resolve false conflicts that are a violation of an established synchronization environment only because the data entries identified as having a relationship signifying the violation were generated on differing member computing devices of the synchronization environment.

In embodiments member computing devices of a synchronization environment can upload data entries that identify the various files and folders of a file hierarchy to a central node. In embodiments the uploaded data entries are used to thereafter sync member computing devices with the central node.

BRIEF DESCRIPTION OF THE DRAWINGS

These and other features will now be described with reference to the drawings of certain embodiments and examples which are intended to illustrate and not to limit, and in which:

FIGS. 5A-5E depict examples of embodiment data entries for various files of an exemplary file hierarchy.

DETAILED DESCRIPTION

In the following description, for purposes of explanation, numerous specific details are set forth in order to provide a thorough understanding of embodiments described herein. It will be apparent however to one skilled in the art that the embodiments may be practiced without these specific details. In other instances well-known structures and devices are either simply referenced or shown in block diagram form in order to avoid unnecessary obscuration. Any and all titles used throughout are for ease of explanation only and are not for any limiting use.

Figure 1:
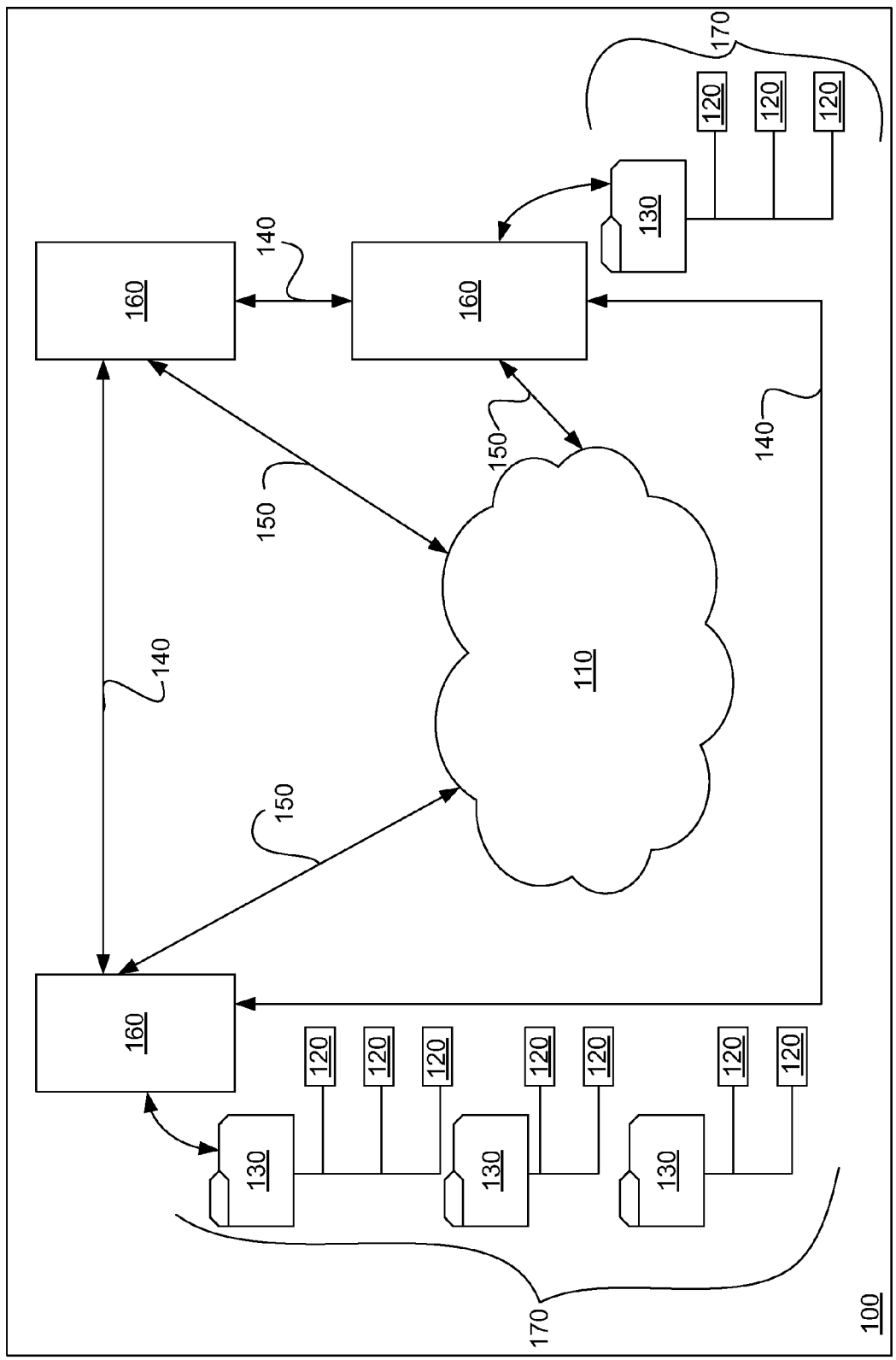
FIG. 1 depicts an embodiment synchronization environment.

FIG. 1 depicts an embodiment synchronization environment 100 that supports the synchronization of file hierarchies 170 on two or more computing devices 160. In an embodiment a file hierarchy 170 consists of one or more files 120. In an embodiment one or more files 120 in a file hierarchy 170 can be grouped into one or more folders 130. The elements of a file hierarchy 170, e.g., the files 120 and the folders 130, are referred to herein as file hierarchy components.

In an embodiment a computing device 160 is a computer or any device or collection of devices capable of running, or executing, software instructions and interacting with a user for creating, inputting, modifying, deleting, organizing, etc. files 120. Computers and computer-based devices, e.g., PDAs (personal digital assistants), etc., are collectively referred to herein as computing devices 160.

In an embodiment synchronization environment two or more computing devices 160 can communicate 140 with each other directly, peer-to-peer. In an embodiment synchronization environment 100 two or more computing devices 160 can also, or alternatively, communicate 150 with each other via a central node 110. In an embodiment a central node 110 is a cloud, or internet-based computing center. In an embodiment the central node 110 can also perform as a peer computing device 160 within a synchronization environment 100.

In an embodiment a user utilizing two or more computing devices 160 and/or various users each utilizing one or more computing devices 160 can share one or more files 120 and/or one or more file hierarchies 170. For example a user can have two or more computing devices 160, e.g., a laptop computer 160 that is transported with the user and a desktop computer 160 that is maintained in the user's residence, to generate documents on, download and store pictures on, etc. As another example two or more users, each with their own computing device 160, may collaborate on developing one or more files 120 for a project or work. As still another example two or more users, each with their own computing device 160, e.g., family members or friends that live in separate localities, may share pictures among themselves.

Users that maintain the same files 120 on two or more computing devices 160 often want to ensure that the same version of each file 120 is stored on each of the computing devices 160. Synchronization, or syncing, is used to maintain the same version of files 120 on multiple computing devices 160.

The synchronization environment 100, while supporting synchronization among its various member computing devices 160, is typically asynchronous in nature. This is because, in part, member computing devices 160 can come online and go offline at random times, and thus, may not be participatory, or not one-hundred percent participatory, in a synchronization supported by the synchronization environment 100. This is also because, in part, a user can initiate the transfer of one or more files 120 between two or more computing devices 160 without involving the synchronization system established for the synchronization environment 100. Thus, the central node, e.g., cloud, 110 generally does not have a complete view at any one time of the file hierarchies 170 that are shared among member computing devices 160 of an embodiment synchronization environment 100.

One class of conflicts that can arise in a synchronization environment 100 is duplicative file hierarchy components. A duplicative file hierarchy component conflict, also referred to herein as a duplicative item conflict, can occur during synchronization between two or more computing devices 160 when there are two or more files 120 with the same name in the same folder(s) 130, i.e., path, of a file hierarchy 170. In an embodiment conflicts such as duplicative item conflicts occur because the central node, e.g., cloud, 110 does not itself enforce the constraints against allowing such conflicts and/or because folders 130 and files 120 are modeled as separate items, or components, of their file hierarchy 170.

Sometimes a duplicative item conflict is a genuine conflict such as in the scenario where two different users, or even one user, have renamed different files 120 on originally different computing devices 160 to the same name. However, a duplicative item conflict can arise that does not represent a true conflict and has no meaning to users, i.e., a false duplicative item conflict, or false conflict. For example, a false conflict can occur when a file 120 is transferred from one computing device 160 to another computing device 160 without the synchronization environment being cognizant of the transfer, e.g., a user emails a file 120 from one computing device 160 to a second computing device 160, a user downloads a file 120 from one computing device 160 to a memory stick and then uploads the same file 120 to a second computing device 160 from the memory stick, etc. In these examples the file 120 on the first computing device 160 is the same as the file 120 on the second computing device 160. However, as the synchronization system for the synchronization environment 100 was not involved in the file 120 transfer each computing device 160 can identify the same file differently, resulting in a false conflict when either of the two computing devices 160 attempts to sync within the synchronization environment 100.

Figure 2:
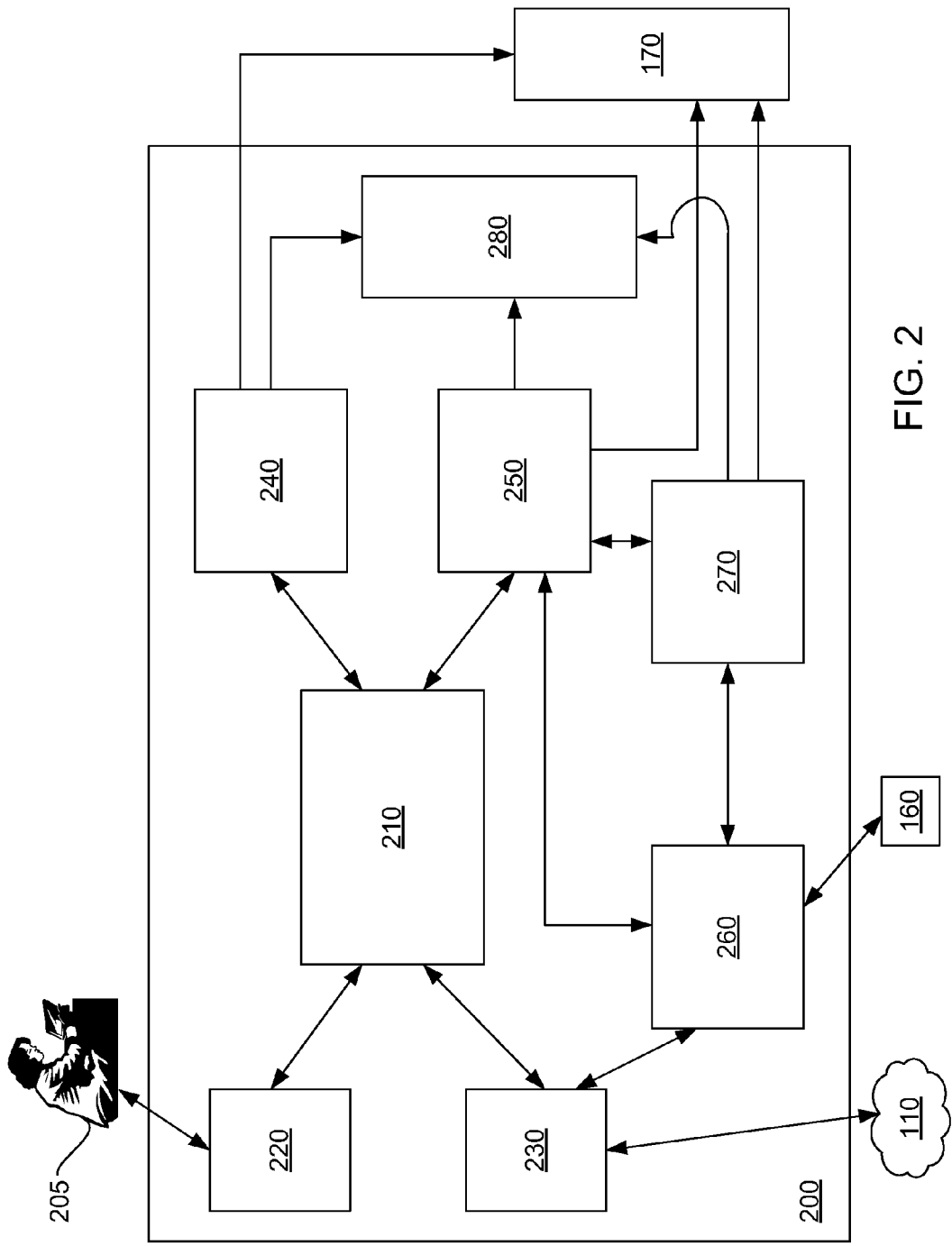
FIG. 2 depicts an embodiment mesh operating environment (MOE).

In synchronization environments a user is notified of identified duplicative item conflicts and instructed to resolve the conflicts in order to ensure that each file 120 in a folder 130 of a file hierarchy 170 stored on each member computing device 160 of the synchronization environment has a unique file name. False conflicts are thus a nuisance to users as it can be easy for a large number of them to be created, they have no meaning to a user as they detail a conflict that in actuality does not exist, and they can be confusing for a user to resolve. Thus, referring to FIG. 2, an embodiment mesh operating environment 200, also referred to herein as a MOE 200, installed and executing on the computing devices 160 of a embodiment synchronization environment 100 employs an optimistic concurrency methodology to resolve false conflicts.

An embodiment MOE 200 executing on a computing device 160 handles the synchronization of file hierarchies 170 between the computing device 160 hosting the MOE 200 and a central node, e.g., cloud, 110 of the embodiment synchronization environment 100, and thus, the other member computing devices 160 of the synchronization environment 100. An embodiment MOE 200 automatically detects duplicative item conflicts and identifies each such conflict as a true conflict or a false conflict. In an embodiment the MOE 200 pushes, i.e., transmits or sends, true conflicts to the central node 110, and thus the synchronization An embodiment MOE 200 has a user interface, UI, 220 component that has the capability to communicates between the MOE 200 executing on the computing device 160 and the user 205 of the computing device 160 hosting the MOE 200.

An embodiment MOE 200 has a cloud interface, CI, 230 component that has the capability to communicates between the MOE 200 operating on the computing device 160 and the central node, e.g., cloud, 110 of the synchronization environment 100.

An embodiment MOE 200 has a manager 210 component that has the capability to instigate, respond to and orchestrate file hierarchy synchronization on the MOE's host computing device 160. In an embodiment the manager 210 is responsible for coordinating the activities of the other MOE 200 components for a synchronization activity on the host computing device 160.

An embodiment MOE 200 has an organizer 250 component that crawls, i.e., scans, a file hierarchy 170 identifying all the folders 130 and files 120 within the file hierarchy 170. In an embodiment the organizer 250 crawls those file hierarchies 170 that are specified, or otherwise identified, by a user 205. In an alternative embodiment the organizer 250 crawls all the file hierarchies 170 stored on or otherwise accessible to the computing device 160. In still other alternative embodiments the organizer 250 crawls other identified file hierarchies 170, e.g., those file hierarchies 170 established or modified within a preset time span, etc.

In an alternative embodiment the organizer 250 utilizes hierarchy change notifications to identify the folders 130 and files 120 of concern within a file hierarchy 170. In a second alternative embodiment the organizer 250 accesses a journaling system database that identifies all changes rendered to a file hierarchy 170 to determine the folders 130 and files 120 of concern. In still other alternative embodiments the organizer 250 can utilize other hierarchy monitoring systems for use in identifying the folders 130 and files 120 of concern within a file hierarchy 170.

In an embodiment the organizer 250 creates and stores a data entry 280 for each folder 130 and each file 120 in a crawled file hierarchy 170. In an alternative embodiment the organizer creates and stores a data entry 280 for other combinations of file hierarchy In an embodiment a data entry 280 is a collection of metadata that describes the corresponding file 120 or folder 130 in a file hierarchy 170. In an embodiment a data entry 280 has various fields that each provides some identification aspect of the respective file hierarchy component.

Figure 4:
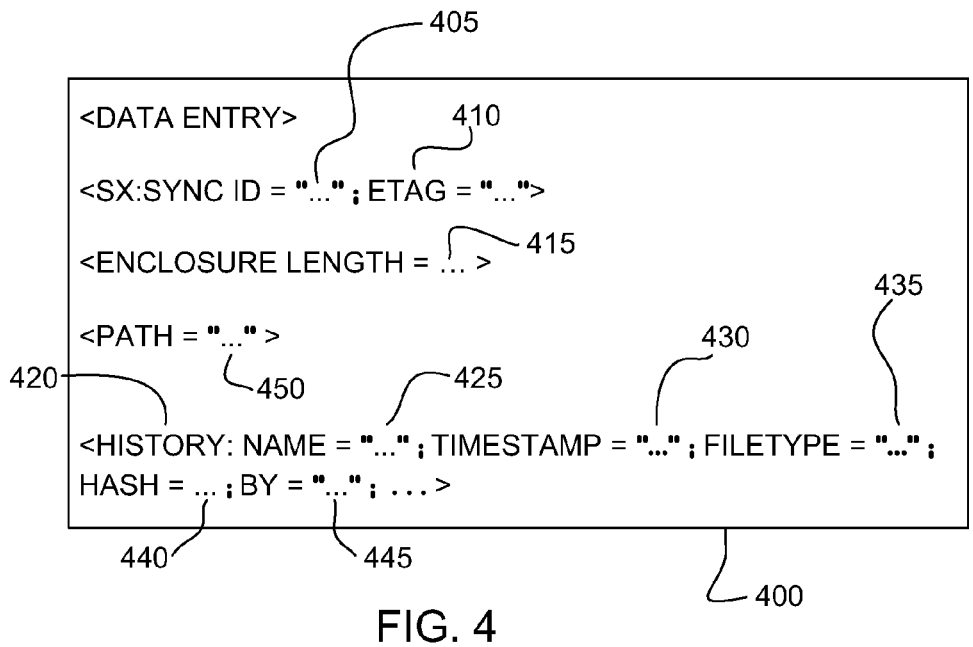
FIG. 4 depicts an embodiment data entry for a file hierarchy component.

Referring to FIG. 4, an embodiment data entry 400 for a file hierarchy component identifies a sync id 405 for the corresponding file hierarchy component; i.e., embodiment data entry 400 has a sync id field 405. In an embodiment the MOE 200 assigns a sync id 405 to each file hierarchy component, e.g., each folder 130 and each file 120 in a file hierarchy 170. In an embodiment the MOE 200 assigns a sync id 405 to each file hierarchy component that is stored on or otherwise accessible to, collectively also referred to herein as stored on, the computing device 160 hosting the MOE 200 at an initial time.

In an embodiment, thereafter the MOE 200 assigns a sync id 405 to a file hierarchy component when a new file hierarchy component is created by a user 205 working on the computing device 160 or otherwise stored on the computing device 160, e.g., stored after emailed or downloaded from a data storage device. In an alternative embodiment, thereafter the MOE 200 assigns a sync id 405 to each new file hierarchy component that has been created by a user 205 working on the computing device 160 or otherwise stored on the computing device 160 within a predefined time span, e.g., within the last twenty-four hours, etc., at a periodic sync time, e.g., eleven-thirty p.m. each evening of each day, etc.

In an embodiment a sync id 405 is a random number. In alternative embodiments a sync id 405 can be other values, e.g., all files 120 in a folder 130 can be assigned consecutive sync id values that are related to the sync id value of the folder 130 they are grouped within, etc.

An embodiment data entry 400 identifies an update, or etag, 410 for the corresponding file hierarchy component, i.e., embodiment data entry 400 has an etag field 410. In an embodiment an etag 410 is assigned by the central node 110 and corresponds to, or otherwise identifies, the last sync upload made to the central node 110 from a member computing device 160. In an alternative embodiment an update, or etag, 410 is associated with, or otherwise stored alongside, the data entry 400 for a file hierarchy component.

In an embodiment when a MOE 200 wants to synchronize a file hierarchy 170 of the computing device 160 within the synchronization environment 100 the MOE 200 uploads the data entries 280 for the file hierarchy 170 to the central node, e.g., cloud, 110. This upload is referred to herein as a sync upload or a sync event. The central node 110 assigns an etag value to the sync event. The assigned etag value is returned by the central node 110 to the MOE 200 of the computing device 160 that instigated the sync event via the MOE's CI 230.

In an embodiment the CI 230, upon receiving an etag from the central node 110, passes, or otherwise makes accessible, the etag to the manager 210, which, in an embodiment, thereafter provides, or otherwise makes accessible, the etag to the organizer 250. In an embodiment the organizer 250 takes a newly received etag and creates, or updates, the etag 410 for each data entry 280 for the respective file hierarchy 170.

In an embodiment, prior to receiving any etag from the central node 110, the MOE's organizer 250 sets each etag 410 in each data entry 280 to a predefined, initial, etag value, e.g., zero (0), etc. In an alternative embodiment, prior to receiving any etag from the central node 110, the organizer 250 leaves the etag 410 in each data entry 280 non-set, i.e., invalid.

In an embodiment the last etag received from the central node 110 is used by the MOE 200 as the etag 410 for each new data entry 280 created for each new file hierarchy component that is generated or stored since this last etag value was received.

An embodiment data entry 400 identifies an enclosure length 415 for the corresponding file hierarchy component, i.e., embodiment data entry 400 has an enclosure length field 415. In an embodiment enclosure lengths 415 are included in data entries 400 for files 120 and indicate the length of the identified file 120. In an embodiment enclosure lengths 415 are included in data entries 400 for folders 130 and indicate the combined length of all the files 120 included in the corresponding identified folder 130. In an alternative embodiment enclosure lengths 415 are included in data entries 400 for files 120 and are the result of a hash algorithm performed on the respect file 120.

An embodiment data entry 400 includes an identification of the path 450, i,e., has a path field 450, for the corresponding file hierarchy component; i.e., the folder(s) that include the corresponding file 120 or folder 130.

An embodiment data entry 400 identifies a history 420 for the corresponding file hierarchy component, i.e., embodiment data entry 400 has a history field 420. In an embodiment a history 420 is included in the data entries 400 for files 120 and includes one or more history components, or history subfields, that each identify an aspect of the corresponding file 120. An embodiment history 420 includes a name 425, i.e., name subfield 425, or name field 425, which is the filename for the corresponding file 120. An embodiment history 420 includes a timestamp 430, i.e., timestamp subfield 430 or timestamp field 430, for the corresponding file 120. In an embodiment a timestamp 430 indicates the date the corresponding file 120 was created and/or last modified. In an embodiment a timestamp 430 also indicates the time the corresponding file 120 was created and/or last modified.

In an embodiment the history 420 of a data entry 400 for a file 120 includes a file type 435, i.e., file type subfield 435, or file type field 435, which identifies the type of file the corresponding file 120 is, e.g., a word document, an excel document, a portable document format, pdf, file, a jpeg file, etc.

In an embodiment the history 420 of a data entry 400 for a file 120 includes a hash 440, i.e., hash subfield 440, or hash field 440, for the corresponding file 120. In an embodiment a hash 440 of a data entry 400 is a checksum for the corresponding file 120. In an embodiment a hash 440 can be used by a MOE 200 to distinguish between two files 120 with the same file name 425 and same enclosure length 415 but differing contents.

An embodiment history 420 for a data entry 400 for a file 120 includes a by, or author, 445, i.e., an author subfield 445, or author field 445. In an aspect of this embodiment the author 445 identifies the original, or first, user 205 to create the corresponding file 120. In an alternative embodiment the author 445 identifies the last user 205 to modify the corresponding file 120. In other alternative embodiments the author 445 can identify other users 205 or combinations of users 205, e.g., each user that ever modified the corresponding file 120, etc.

In other embodiments a data entry 400 can include more, less and/or different metadata items, and thus fields, about or related to the corresponding file hierarchy component.

Referring again to FIG. 2, an embodiment MOE 200 has a modifier 240 component that has the capability to keep track of the files 120 and folders 130 that are added, deleted, altered and/or modified since a last sync event involving the MOE 200 on the computing device 160. In an embodiment the modifier 240 creates new data entries 280 for added folders 130 and files 120 and modifies data entries 280 for deleted folders 130 and files 120 and modified folders 130 and files 120. For example, once a file 120 is modified, in an embodiment the modifier 240 updates the timestamp 430 of the data entry 280 for the modified file 120 to identify the time the file 120 was modified, updates the hash 440 to correspond to the file's new checksum due to modifications, and updates the enclosure length 415 to reflect the file's new length.

In an alternative embodiment the modifier 240 keeps track of the files 120 and folders 130 that are added, deleted, altered and/or modified since a last sync event involving the MOE 200 on the computing device 160 and the organizer 250 uses information from the modifier 240 to create new and/or modify data entries 280 accordingly.

In an alternative aspect of this alternative embodiment the organizer 250 uses information generated by the modifier 240 to identify the file hierarchy components the organizer 250 is to crawl to create and/or modify appropriate data entries 280.

In a second alternative aspect of this alternative embodiment the organizer 250 uses information generated by the modifier 240 to determine changes have been made to a file hierarchy 170. In this second alternative aspect the organizer 250, upon identifying that changes have been made to a file hierarchy 170, thereafter crawls the file hierarchy 170 and creates and/or modifies appropriate data entries 280.

An embodiment MOE 200 has a fetcher 260 component that has the capability to fetch, i.e., coordinate the downloading of, files 120 to the computing device 160 or to a data storage device accessible by the computing device 160. In an embodiment the fetcher 260 operates during a sync event when there are one or more files 120 from one or more other member computing devices 160 of the synchronization environment 100 that are not currently stored on the computing device 160 the MOE 200 is operating on. In an embodiment the fetcher 160 fetches files 120 peer-to-peer from one or more other member computing devices 160. In an embodiment the fetcher 160 fetches files 120 via the central node 110.

In an embodiment the fetcher 160 fetches files 120 from the central node 110 via the CI 230. In an alternative embodiment the fetcher 160 fetches files 120 by communicating itself with the central node 110.

An embodiment MOE 200 has a realizer 270 component that has the capability to use data entries 280 to organize fetched files 120 in their correct locations in a file hierarchy 170. In an embodiment the realizer 270 operates during a sync event when there are one or more files 120 from one or more other member computing devices 160 of the synchronization environment 100 that are fetched and are to be stored on the member computing device 160.

In an embodiment the manager 210 of the MOE 200 determines, via the MOE's communications with the central node 110, that there are one or more files 120 to be synched, i.e., downloaded or otherwise made accessible to, the computing device 160 the MOE 200 is operating on. In an embodiment the manager 210 notifies the organizer 250 of the sync event. In an embodiment the organizer 250 uses data entries 280 received from the central node 110 for the sync event to generate the file hierarchy 170 or those new portions of the file hierarchy 170 that are the subject of the sync event. In an embodiment the organizer 250 stores data entries 280 downloaded by the central node 110 for the sync event.

In an embodiment the organizer 250 creates new folders 130 as indicated by the data entries 280 that are the subject of the sync event. In an embodiment the organizer 250 notifies the fetcher 260 to fetch the new files 120 that are the subject of the sync event. In an embodiment the fetcher 260 notifies the realizer 270 when a new file 120 has been fetched and is to be organized within the file hierarchy 170. In an embodiment the realizer 270 thereafter organizes the fetched file 120 within the file hierarchy 160.

In an embodiment different member computing devices 160 of a synchronization environment 100 can be at different stages of synchronization with their fellow member computing devices 160 at any particular time. For example at a time t1, two computing devices 160 of a synchronization environment 100 may host the same exact folders 130 and files 120 of a file hierarchy 170, a third member computing device 160 may host the same folders 130 and all the same files 120 save one file 120 that does not exist in the third computing device's file hierarchy 170, and a fourth member computing device 160 may not have file hierarchy 170 components. In an embodiment and this example the data entry 280 that is the subject of a sync event for the third computing device 160 is the data entry 280 for the one file 120 that is not in the third computing device's file hierarchy 170. In an embodiment and this example the data entries 280 that are the subject of a sync event for the fourth computing device 160 are the data entries 280 for all the folders 130 and files 120 of the file hierarchy 170.

As noted, in an embodiment a MOE 200 can facilitate the synchronization of files 120 and file hierarchies 170 between the computing device 160 the MOE 200 operates on and other computing devices 160 within the synchronization environment 100. In an embodiment, as part of this synchronization the MOE 200 can identify and resolve false conflicts that arise during a sync event.

In an embodiment the manager 210 of a MOE 200 operating on a member computing device 160 initiates a sync event, via its CI 230, with the central node 110 of its synchronization environment 100. In an embodiment a sync event can be a request to download changes, e.g., new components, modified components, etc., of a file hierarchy 170 to the computing device 160 when there have been no changes made via the computing device 160 to the file hierarchy 170 for a delta time or the file hierarchy does not exist or is not available to the computing device 160. In an embodiment a sync event can be a request to download changes of a file hierarchy 170 to the computing device 160 after a predetermined time span has elapsed; e.g., the computing device 160 is synced within the synchronization environment 100 at least once every twenty-four hours, etc. In an embodiment a sync event can be a request to provide, or otherwise identify, changes to a file hierarchy 170, e.g., file 120 and/or folder 130 additions, file 120 modifications, file 120 and/or folder 130 deletions, etc., to the central node 110 for synchronizing the file hierarchy 170 for other member computing devices 160 within the synchronization environment 100. In other embodiments a sync event can be triggered by other and/or additional events, e.g., user 205 requests, etc.

In an embodiment as part of a synchronization event request sent to the central node 110 to initiate a sync event the MOE 200 passes to, or otherwise identifies for, the central node 110 the MOE's current etag 410. In an embodiment, if the MOE 200 does not have an etag 410 because, e.g., it has not previously engaged in a sync event with the central node 110, then the MOE 200 passes the central node 110 an initial or invalid etag 410. In another embodiment, if the MOE 200 does not have an etag 410 when it communicates a synchronization event request to the central node 110 then it does not pass any etag 410 to the central node 110.

In an embodiment when the central node 110 receives a synchronization event request from a MOE 200 the central node 110 compares the MOE's etag 410 with the central node's current etag. In an embodiment if the etag values match the computing device 160 is current with the central node 110 and the MOE 200. In an embodiment if the etag values match the central node 110 accepts the synchronization event request and allows the sync event to progress.

In an embodiment if the etag values do not match, e.g., the MOE's etag 410 is a smaller value than the central node's current etag, the MOE 200 did not pass an etag 410 to the central node 110, etc., the computing device 160 is not current with the cloud 110; i.e., the computing device 160 is not synched. In an embodiment the central node 110 will refuse a synchronization event request from a computing device 160 involving an upload of data entries 280 from the computing device 160 to the central node 110 until such time as the computing device 160 becomes current with the central node 110, i.e., until the computing device 160 downloads the file hierarchy 170 changes that will bring the file hierarchy 170 stored on the computing device 160 current with the central node 110.

In an embodiment at some initial time the central node 110 will receive a first synchronization event request from a MOE 200 operating on a member computing device 160, i.e., the first synchronization event request since any MOE 200 became active within the synchronization environment 100. In this embodiment and sync event the central node 110 accepts the synchronization event request and will allow data entry 280 uploads from the member computing device 160. In an embodiment the central node 110 establishes an initial etag, e.g., one (1), for this first synchronization event request.

In an embodiment the central node 110 maintains, i.e., stores, data entries 280 provided to it by the MOEs 200 of the various member computing devices 160. In an embodiment the central node 110 is not aware of, nor does it have to be aware of, the underlying file hierarchy contents associated with the data entries 280.

In an embodiment the central node 110 changes its etag each time a MOE 200 of a member computing device 160 initiates a sync event that results in the computing device 160 uploading data entries 280 to the central node 110. In an embodiment the central node 110 can identify the data entries 280 associated with each etag value. In an embodiment in this manner the central node 110 can determine the data entries 280 to download to a member computing device 160 in order for the member computing device 160 to take the steps to become current with the cloud 110, i.e., to be synched.

For example, a first member computing device 160 uploads ten data entries 280 to the cloud 110 as part of a sync event for a file hierarchy 170. In this example the central node 110 assigns a first etag value, e.g., one (1), for the ten data entries 280. In this example a second member computing device 160 thereafter issues a synchronization event request with an invalid etag 410 that involves an upload of data entries 280 to the central node 110. In this example and an embodiment the central node 110 will refuse the second computing device's synchronization event request until the second computing device 160 syncs. In this example and an embodiment, as part of the process of syncing the central computing device downloads the ten data entries 280 associated with the etag value of one (1) to the second computing device 160. Thereafter, in this example the second computing device 160 uploads six data entries 280 to the central node 110 as part of a sync event for the same file hierarchy 170. In this example the central node 110 assigns a second etag value, e.g., two (2), for these six data entries 280.

In this example if a third member computing device 160 thereafter issues a synchronization event request to the central node 110 with an invalid etag value the central node 110 refuses the synchronization event request as the third computing device 160 is not synced. In this example and an embodiment as part of the sync effort for the third computing device 160 the central node 110 downloads the ten data entries 280 associated with the etag value of one and the six data entries 280 associated with the etag value of two to the third computing device 160.

In an embodiment once a MOE 200, via its CI 230, receives one or more data entries 280 downloaded from the central node 110 the MOE's manager 210 reviews the downloaded data entries 280 and compares them to any existing data entries 280 maintained by the MOE 200 for the same file hierarchy 170, i.e., any stored data entries 280. In an embodiment the manager 210 reconciles the downloaded data entries 280 with the stored data entries 280. In an aspect of this embodiment the manager 210 reconciles the folders 130 and files 120 represented by the downloaded data entries 280 with any local changes made to the same file hierarchy 170, e.g., file 120 modifications, file 120 additions, the renaming of files 120, etc.

In an embodiment if the manager 210 identifies a downloaded data entry 280 for a file 120 that is not currently stored on the MOE's computing device 160 the manager 210 notifies the realizer 270 that a new file 120 is to be added to the file hierarchy 170. In an embodiment the realizer 270 notifies the fetcher 260 to fetch the new file 120. In an embodiment the fetcher 260 downloads the new file 120 from the computing device 160 that provided the data entry 280 identifying the new file 120 to the central node 110. In an embodiment the fetcher 260 alternatively obtains the new file 120 from the central node 110. In this embodiment the central node 110 previously obtained the new file 120 from the computing device 160 that provided the data entry 280 identifying the new file 120 to the central node 110.

In an embodiment, once the fetcher 260 downloads the identified new file 120, the fetcher 260 notifies the realizer 270 and the realizer 270 thereafter stores the identified new file 120 in the proper position, i.e., path, in the file hierarchy 170. In an embodiment the realizer 270 stores the downloaded data entry 280 identifying the new file 120 in the data entries 280 of the MOE 200.

In an embodiment if the manager 210 identifies a downloaded data entry 280 evidencing a file 120 has been deleted on a member computing device 160, i.e., a deletion data entry, and the file 120 is currently stored on the MOE's computing device 160, the manager 210 notifies the realizer 270 that a file 120 is to be deleted from the file hierarchy 170. In an embodiment the realizer 270 deletes the file 120 from the file hierarchy 170 for the MOE's computing device 160. In an embodiment the realizer 270 deletes the downloaded data entry 280 evidencing the deleted file 120. In an embodiment the realizer 270 also deletes the stored data entry 280 for the deleted file 120.

As noted an embodiment MOE 200 can identify and resolve false duplicative item conflicts that arise during a sync event. This MOE 200 capability minimizes the central node 110 and users' interactions in a synchronization environment 100 to resolve conflicts that arise from established environment constraints.

In an embodiment if the manager 210 identifies a downloaded data entry 280 for a file 120 that has the same name 425 and the same path 450 as a file 120 currently stored on the MOE's computing device 160 but the stored file 120 has a stored data entry 280 with a different sync id 405 than the downloaded data entry's sync id 405, a constraint violation exists for a duplicative item conflict.

In an embodiment the manager 210 determines whether the duplicate item conflict is true or false. In an embodiment the manager 210 checks whether the downloaded data entry 280 has the same enclosure length 415 and, if it exists, the same hash 440 as the corresponding stored data entry 280. If these data entry field values match the downloaded data entry 280 identifies the same file 120 as the MOE's stored data entry 280 and the duplicative item conflict is false. In an embodiment in this event the MOE 200 resolves the false conflict locally without involving the central node 110 or a user 205. In an embodiment the manager 210 replaces the stored data entry 280 for the file 120 with the downloaded data entry 280. In an embodiment the MOE 200 need not fetch the file 120 identified by the downloaded data entry 280 as it is the same file 120 as the one stored on the MOE's computing device 160.

In the alternative event that the downloaded data entry enclosure length 415 does not match the enclosure length 415 in the corresponding stored data entry 280 and/or the downloaded data entry hash 440 does not match the hash 440 in the corresponding stored data entry 280 then the file 120 identified in the downloaded data entry 280 is not the same as the file 120 stored on the MOE's computing device 160. This alternative event results in a true conflict. In an embodiment in this alternative event the manager 210 creates a new, conflict, data entry 280 for the corresponding file 120 that identifies there is a conflict between the file 120 stored on the MOE's computing device 160 and the file 120 identified in the downloaded data entry 280 stored on another member computing device 160.

In an embodiment for a true conflict the manager 210 replaces its stored data entry 280 for the identified duplicative item file 120 and the downloaded data entry 280 for the identified duplicative item file 120 with the newly created conflict data entry 280. An exemplary embodiment conflict data entry 280 is depicted in FIG. 5E and further discussed below.

Figure 3:
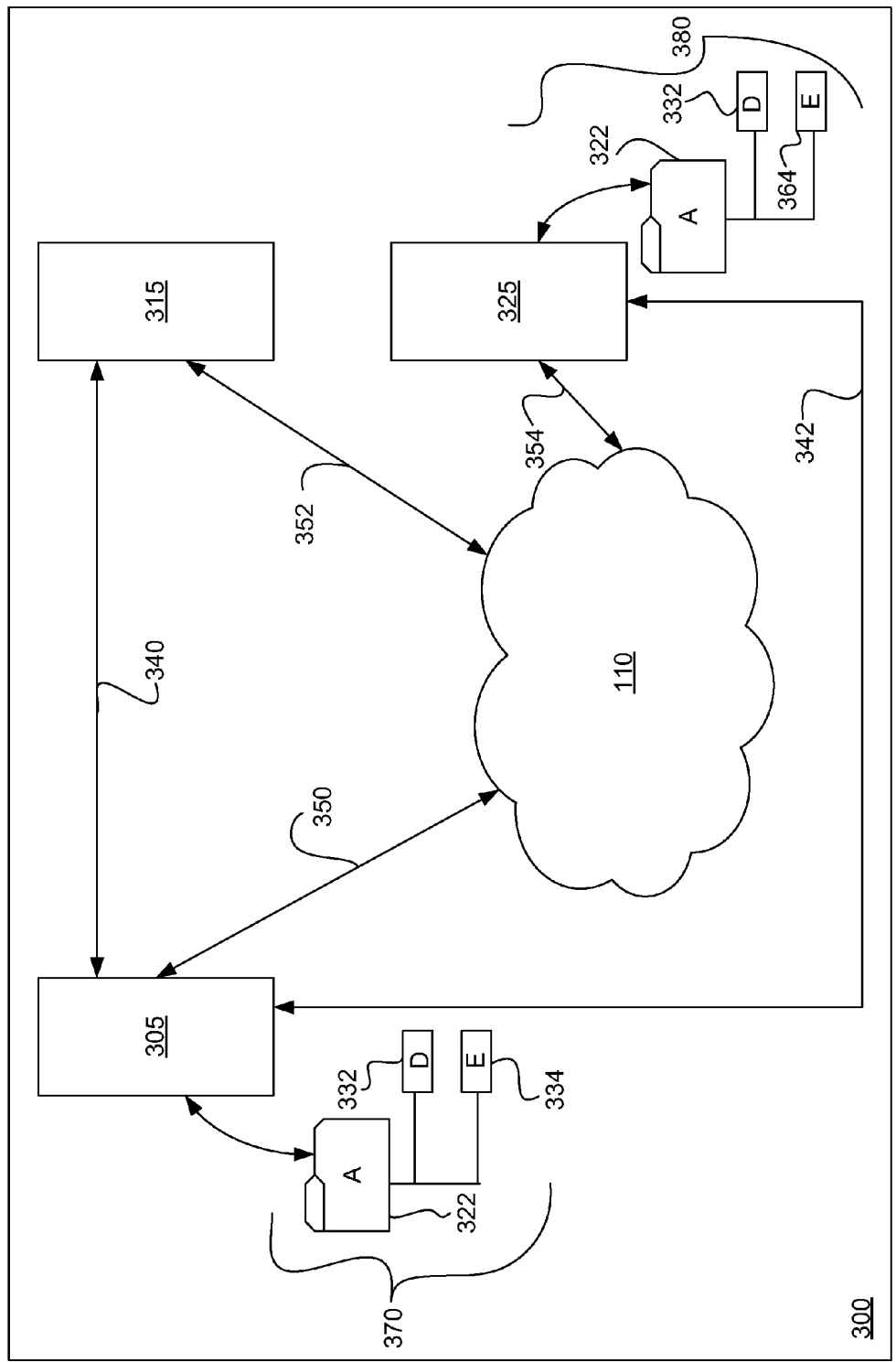
FIG. 3 depicts an example of an embodiment synchronization environment with three computing devices.

FIG. 3 depicts an exemplary synchronization environment 300 that includes three computing devices 160, computing device 305, computing device 315 and computing device 325, and a central node 110, cloud 110. In the example of FIG. 3 each of the three computing devices 160 are in a different stage of synchronization with their follow computing devices 160 at a time t1. At a time t1, computing device 305 has a file hierarchy 370 that includes one folder A 322. In this example folder A 322 for the computing device 305 includes two files 120, file D 332 and file E 334.

At time t1 computing device 315 has no comparative file hierarchy 170 for the file hierarchy 370 of computing device 305.

At time t1 computing device 325 has a file hierarchy 380 that includes one folder A 322. In this example at time t1 folder A 322 for computing device 325 includes two files, file D 332 and file E 364. In this example file D 332 stored on computing device 325 is the same file as file D 332 stored on computing device 305. In this example file E 364 stored on computing device 325 is a different version of, or different file than, file E 334 stored on computing device 305. In this example folder A 322 stored on computing device 325 is an equivalent folder 130 to folder A 322 stored on computing device 325.

In an embodiment and the example of FIG. 3 at a time t2 the MOE 200 operating on computing device 305 communicates 350 with the cloud 110 to initiate a sync event for the file hierarchy 370. In this example at time t2 no computing device 160 has previously initiated a sync event with the cloud 110 and this is an initial sync event within the synchronization environment 300. In an embodiment the organizer 250 of the MOE 200 for the computing device 305 has previously crawled the file hierarchy 370 and generated data entries 280 for the folders 130 and files 120 of the file hierarchy 370.

In an embodiment as the computing device 305 has not previously been involved in a sync event with the cloud 110 the etags 410 for each of the data entries 280 for the file hierarchy 370 either have a non-valid value, or, alternatively, are not set.

In an embodiment, upon receiving a synchronization event request from the computing device 305 involving a request to upload data entries 280 to the cloud 110, the cloud 110 determines this is an initial sync event for the synchronization environment 300. In an embodiment the cloud 110 communicates 350 an initial etag value to the MOE 200 operating on the computing device 305, e.g., one (1). In an embodiment the MOE 200 operating on the computing device 305 updates all its data entries 280 for the file hierarchy 370 to have etags 410 with a value of one (1). In an embodiment the manager 210 of the MOE 200 operating on the computing device 305 receives the new etag value from the cloud 110, via the CI 230, and provides this etag value to the organizer 240 to update the data entries 280 for the file hierarchy 370.

Figure 5A:
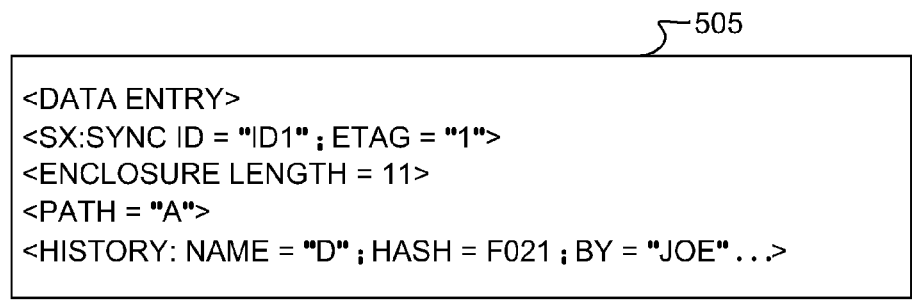

In an embodiment the manager 210 of the MOE 200 operating on the computing device 305, via its CI 230, uploads 350 the data entries 280 for the file hierarchy 370 to the cloud 110. An exemplary data entry 505 for file D 332 is depicted in FIG. 5A. An exemplary data entry 515 for file E 334 is depicted in FIG. 5C.

As there are no other data entries 280 in the cloud 110 for the file hierarchy 370 at time t2 the sync event initiated by the computing device 305 is concluded.

In an embodiment and the example of FIG. 3 at a time t3 the MOE 200 operating on computing device 315 communicates 352 via its CI 230 with the cloud 110 to initiate a sync event. In this example at time t3 the computing device 315 does not store file hierarchy 370. As there is no file hierarchy 170 associated with computing device 315 at the time of its synchronization event request sent to the cloud 110 this request is for the computing device 315 to sync itself with the cloud 110, and, thus, the synchronization environment 300.

In an embodiment as the computing device 315 has not previously been involved in a sync event with the cloud 110 the etag value associated with its synchronization event request at time t3 is either a non-valid value, e.g., zero (0), or, alternatively, there is no etag value associated with this synchronization event request.

In an embodiment, upon receiving the synchronization event request from the computing device 315 the cloud 110 determines this is an initial sync event for the computing device 315. In an embodiment the cloud 110 downloads 352 the data entries 280 it previously received from the computing device 305 and which are associated with its current etag value of one (1) to the computing device 315. In an embodiment the MOE 200 operating on the computing device 315 receives the data entries 280 from the cloud 110 via its CI 230 and, via its realizer 270, creates the corresponding file hierarchy 370. In an embodiment the realizer 270 of the MOE 200 operating on the computing device 315 uses the downloaded data entries 280 to generate folder A 322 on the computing device 315. In an embodiment the fetcher 260 of the MOE 200 operating on the computing device 315 fetches files D 332 and E 334 from the computing device 305 via a peer-to-peer communication 340. Alternatively, in an embodiment the fetcher 260 of the MOE 200 operating on the computing device 315 fetches files D 332 and E 334 from the cloud 110 via the cloud-to-computing device communication 352, after these files 120 have been uploaded to the cloud 110 from the computing device 305.

In an embodiment, after a file 120 in the file hierarchy 370 is downloaded to the computing device 315 the realizer 270 uses the data entries 280 previously downloaded from the cloud 110 for the file hierarchy 370 to organize the file 120 within the file hierarchy 370. In an embodiment the downloaded data entries 280 are stored on the computing device 315.

Once the file hierarchy 370 is recreated on the computing device 315 the sync event initiated by the computing device 315 is concluded. At this conclusion, in the example of FIG. 3, the data entries 280 for the file hierarchy 370 stored on the computing device 315 are the same as the data entries 280 for the file hierarchy 370 stored on the computing device 305.

In an embodiment and the example of FIG. 3 at a time t4 the MOE 200 operating on computing device 325 communicates 354 with the cloud 110 to initiate a sync event. In an embodiment and the example of FIG. 3, as the computing device 325 has not previously been involved in a sync event with the cloud 110 the etag value associated with its synchronization event request at time t4 is either a non-valid value, e.g., zero (0), or, alternatively, there is no etag value associated with this synchronization event request.

In an embodiment, upon receiving the synchronization event request from the computing device 325 the cloud 110 determines this is an initial sync event for the computing device 325. In an embodiment, as the computing device 325 has a version of the file hierarchy 370 at time t4 its synchronization event request includes a request to upload its data entries 280 for the file hierarchy 370 to the cloud 110. In an embodiment as the cloud 110 already has data entries 280 for the file hierarchy 370 and the computing device 325's etag, e.g., zero (0) or nonexistent, does not match the cloud's current etag, e.g., one (1), the cloud 110 does not allow the computing device 325 to upload data entries 280 for the file hierarchy 370 until the computing device 325 syncs with the cloud 110 for this file hierarchy 370.

In an embodiment the cloud 110 downloads 354 the data entries 280 it previously received from the computing device 305 and which are associated with its current etag value of one (1) to the computing device 325. In an embodiment the MOE 200 operating on the computing device 325 receives the data entries 280 from the cloud 110 via its CI 230.

Figure 5B:
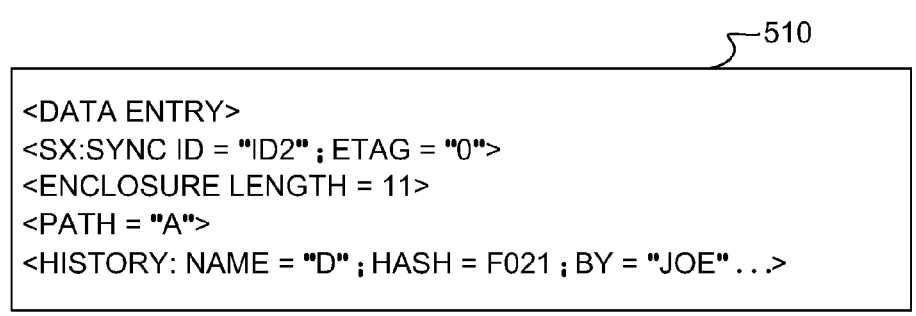

In an embodiment the organizer 250 of the MOE 200 for the computing device 325 has previously crawled the file hierarchy 370 associated with the computing device 325 and generated data entries 280 for the folder A 322 and its files D 332 and E 364. An exemplary data entry 510 for file D 332 is depicted in FIG. 5B. An exemplary data entry 520 for file E 364 is depicted in FIG. 5D.

In an embodiment upon receiving the data entries 280 from the cloud 110 the MOE's manager 210 executing on the computing device 325 works to locally reconcile duplicative item conflicts between the data entries 280 downloaded and the stored data entries 280 previously created by the MOE 200 for the file hierarchy 370 associated with the computing device 325.

In an embodiment the manager 210 reconciles data entry 505 of FIG. 5A for the file D 332 originating from computing device 305 with the data entry 510 of FIG. 5B for the file D 332 originating from computing device 325.

In the example of FIG. 3, file D 332 stored on computing device 305 is the same as file D 332 stored on computing device 325, i.e., each file D 332 has the same contents, and thus, the same name 425, enclosure length 415, path 450, file type 435 and hash 440. In this example, the only relevant difference between data entry 505 and data entry 510 for file D 332 is the data entry 505 has a sync id 405 of ID1 and data entry 510 has a sync id 405 of ID2.

In an embodiment the manager 210 of the MOE 200 operating on the computing device 325 determines that downloaded data entry 505 and stored data entry 510 identify the same file D 332 and thus the duplicative item conflict for conflict pair data entries 505 and 510 is a false conflict. In an embodiment the manager 210 instructs the organizer 240 to replace data entry 510 with data entry 505, which locally and automatically resolves the constraint violation of no more than one file with the same file name in a file hierarchy and resolves the false conflict.

In an embodiment the manager 210 reconciles data entry 515 of FIG. 5C for the file E 334 originating from computing device 305 with the data entry 520 of FIG. 5D for the file E 364 originating from computing device 325.

In the example of FIG. 3, file E 364 cannot be automatically determined to be the same as file E 334 as the enclosure lengths 415 and hashes 440 for their respective data entries 515 and 520 are different. In this example, while file E 364 may be a different version of file E 334, the MOE 200 operating on the computing device 325 cannot determine which version a user 205 would prefer to keep stored on computing device 325. Moreover, file E 364 may be an entirely different file 120 than file E 334 even though they have the same name 425 and path 450; e.g., one or different users 205 named two separate files 120 stored in the same path 450 the same name 425.

In this scenario in an embodiment the manager 210 of the MOE 200 operating on the computing device 325 identifies a true duplicative item conflict for file E 332 and file E 364.

In an embodiment and the example of FIG. 3, upon the manager 210 identifying a true conflict the manager 210 instructs the organizer 240 to generate a new, conflict, data entry 280 for file E 364 and file E 334. An embodiment conflict data entry 280 identifies itself as a conflict data entry and combines meta data from the data entries 280 it is derived from. An embodiment exemplary conflict data entry 525 for file E 364 and file E 334 is depicted in FIG. 5E.

In an embodiment conflict data entry 525 has a conflict identity 530. In an embodiment and the example of FIG. 3 conflict data entry 525 includes the meta data 535 from data entry 515 of FIG. 5C, e.g., the sync id 405, etag 410, enclosure length 415, path 450 and history 420 of data entry 515. In an embodiment and the example of FIG. 3 conflict data entry 525 also includes the meta data 540 from data entry 520 of FIG. 5D, e.g., the sync id 405, etag 410, enclosure length 415, path 450 and history 420 of data entry 520.

In an embodiment and the example of FIG. 3 the organizer 240 of the MOE 200 operating on the computing device 325 replaces stored data entry 520 for file E 364 and the downloaded data entry 515 for file E 334 with conflict data entry 525.

In an embodiment after receiving the downloaded data entries 280 from the cloud 110 for file hierarchy 370 the MOE 200 operating on the computing device 325 receives the cloud's current etag from the cloud 110. In an embodiment the organizer 250 of the MOE 200 operating on the computing device 325 updates its data entries 280 for the file hierarchy 380 as relevant with the current etag value communicated 354 from the cloud 110. In an embodiment the sync event for synching the computing device 325 with the cloud 110 is concluded.

In an embodiment the computing device 325 may thereafter upload its own data entries 280 to the cloud 110 by initiating another sync event with a synchronization event request that indicates a request to upload data entries 280 to the cloud 110. Thus, in the example of FIG. 3 at a time t5 the computing device 325 communicates 354 another synchronization event request to the cloud 110. At this time t5 the etag value associated with the synchronization event request, e.g., one (1), sent from the computing device 325 matches the cloud's current etag. Thus, in an embodiment and the example of FIG. 3 the cloud accepts this synchronization event request from the computing device 325.

In an embodiment the cloud 110 updates its etag, e.g., to two (2), and sends the updated etag to the computing device 325. In an embodiment the organizer 250 of the MOE 200 operating on the computing device 325 updates its data entries 280 for the file hierarchy 380 as relevant with the current etag value two (2). In an embodiment the manager 210 of the MOE 200 operating on the computing device 325, via its CI 230, uploads 354 its data entries 280 for the file hierarchy 380 to the cloud 110.

In an embodiment the MOE 200 operating on the computing device 325 only uploads those stored data entries 280 for the file hierarchy 380 that it did not previously receive as a download from the cloud 110. In an alternative embodiment the MOE 200 operating on the computing device 325 uploads all its stored data entries 280 for the file hierarchy 380 to the cloud 110.

In an embodiment, whenever a MOE 200 operating on a member computing device 160 is allowed to upload one or more data entries 280 to the central node 110 the central node 110 establishes a new etag that is associated with the upload. In an embodiment the central node 110 communicates the new etag to the computing device 160 that has requested to upload data entries 280. In an embodiment the MOE 200 operating on the computing device 160 that receives a new etag from the central node 110 uses the new etag to update the etags 410 for each of its data entries 280 associated with the file hierarchy 170 that is the subject of the upload.

In an embodiment, upon receiving a conflict data entry, e.g., conflict data entry 525, the cloud 110 issues a conflict resolution request to all computing devices 160 of the synchronization environment 100 for their users 205 to resolve the conflict. In alternative embodiments, upon receiving a conflict data entry the cloud 110 issues a conflict resolution request to a subset of computing devices 160 of the synchronization environment 100 for their users 205 to resolve the conflict; e.g., to the computing device 160 that generated the conflict data entry 280; to the computing device 160 that generated the conflict data entry 280 and the computing device 160 that generated the original data entry 280 that resulted in the conflict data entry, e.g., computing devices 305 and 325 of FIG. 3 for conflict data entry 525; to those computing devices 160 of the synchronization environment 100 that have issued a synchronization event request to the cloud 110 within a predefined time, e.g., the last twenty-four hours from when the cloud 110 received the current conflict data entry 280, etc.; etc.

In an embodiment the conflict resolution request includes or is otherwise associated with the conflict data entry 280, e.g., conflict data entry 525 for the example of FIG. 3.

In an embodiment if a MOE 200 receives a conflict resolution request from the central node 110 of its synchronization environment 100 the MOE 200 communicates with the user 205 to resolve the conflict identified in the associated conflict data entry 280.

In an embodiment, once a user 205, or users 205, has resolved a duplicative item conflict the MOE 200 of their computing device 160 generates a new data entry(s) 280 to replace the conflict data entry 280.

In an alternate embodiment and the example of FIG. 3, upon the manager 210 of the MOE 200 operating on the computing device 325 identifying a true conflict with file E 364 and file E 334, the manager 210 communicates with the user 205 of the computing device 325, via its UI 220, to request user input as to how to handle the duplicative item conflict. In an aspect of this alternative embodiment the manager 210 waits a predefined time for a user response. In an aspect of this alternative embodiment and with reference to the example of FIG. 3 if the manager 210 receives a timely response from a user 205 regarding a true conflict the manager 210 coordinates the appropriate user-indicated actions with regard to file E 364 and file E 334 on the computing device 325.

For example, in this alternative embodiment and referencing the example of FIG. 3 if a user 205 instructs that file E 334 is to replace file E 364 stored on computing device 325, in an embodiment the fetcher 260 of the MOE 200 operating on the computing device 325 fetches file E 334 from the computing device 305 via a peer-to-peer communication 342. Alternatively, the fetcher 260 of the MOE 200 operating on the computing device 325 fetches file E 334 from the cloud 110 via the cloud-to-computing device communication 354, subsequent to file E 334 having been uploaded to the cloud 110 from the computing device 305.

In this alternative embodiment and example, after file E 334 is downloaded to the computing device 325 the realizer 270 uses the data entry 515 previously downloaded from the cloud 110 to organize file E 334 within the file hierarchy 380 by replacing file E 364 with file E 334. In an alternative embodiment and this example the organizer 240 replaces data entry 520 with data entry 515 and now computing device 325 is in sync with the cloud 110, and computing device 305, with regard to file E 334 of folder A 322.

As a second example in an alternative embodiment and referencing the example of FIG. 3, if a user 205 instructs that file E 364 is to be renamed, e.g., to file H, in an embodiment the modifier 250 renames file E 364 to file H and updates data entry 520 appropriately, e.g., updates the name 425 to H in the history 420 of the data entry 520. In another alternative embodiment and this second example the modifier 250 renames file E 364 to file H and notifies the organizer 240 to update the data entry 520 appropriately. In this alternative embodiment and this second example file E 334 now still needs to be included in folder A 322 of file hierarchy 380 for the computing device 325.

In an alternative embodiment and this second example the fetcher 260 of the MOE 200 operating on the computing device 325 fetches file E 334 from the computing device 305 via a peer-to-peer communication 342. Alternatively, the fetcher 260 of the MOE 200 operating on the computing device 325 fetches file E 334 from the cloud 110 via the cloud-to-computing device communication 354, subsequent to file E 334 having been uploaded to the cloud 110 from the computing device 305.

In an alternative embodiment, after file E 334 is downloaded to the computing device 325 the realizer 270 uses the data entry 515 previously uploaded from the cloud 110 to organize file E 334 within the file hierarchy 380. In an embodiment and this second example computing device 325 is now in sync with the cloud 110, and computing device 305, with regard to file E 334 of folder A 322.

As a third example in an alternative embodiment and referencing the example of FIG. 3, if a user 205 instructs that file E 364 is to replace file E 334, e.g., file E 364 is the more current version, in an embodiment a true duplicative item conflict will continue to exist within the synchronization environment 300. This is because while the MOE 200 operating on the computing device 325 maintains file E 364 in folder A 322 of the file hierarchy 380, the MOE 200 operating on the computing device 305 is still maintaining file E 334 in folder A 322 of the equivalent file hierarchy 370. Thus, within the synchronization environment 300 there remain two different files 120 named E within the same path.

In an alternative embodiment for this third example where a true duplicative item conflict continues to exist within the synchronization environment 300 of FIG. 3, the manager 210 of the MOE 200 operating on the computing device 325 instructs the organizer 240 to generate a conflict data entry 280 for file E 364 and file E 334. In an embodiment for this third example and FIG. 3 the organizer 240 of the MOE 200 operating on the computing device 325 replaces stored data entry 520 for file E 364 and uploaded data entry 515 for file E 334 with conflict data entry 525.

In an aspect of an alternative embodiment with regard to the example of FIG. 3 if the manager 210 of the MOE 200 operating on the computing device 325 fails to receive a user response on how to handle the true conflict associated with file E 364 and file E 334 in the prescribed time the manager 210 instructs the organizer 240 to generate a conflict data entry 280 for file E 364 and file E 334. In this aspect of this alternative embodiment and the example of FIG. 3 the organizer 240 of the MOE 200 operating on the computing device 325 replaces data entry 520 for file E 364 and uploaded date entry 515 for file E 334 with the new conflict data entry 525.

In an aspect of this alternative embodiment sometime thereafter the computing device 325 uploads its data entries 280, including conflict data entry 525, to the cloud 110.

In an embodiment as discussed herein one class of conflicts that is managed by the MOE 200 operating on a computing device 160 is duplicative file hierarchy components. In other embodiments other and/or additional classes of conflicts, i.e., constraints, are managed by the MOE 200 operating on a computing device 160, e.g., file type conflicts, e.g., constraints imposed on the file type(s) that can be stored in specific folders or file hierarchies, etc., folder size conflicts, etc.

While in embodiments discussed herein tasks have been assigned to various identified components of an embodiment mesh operating environment (MOE) 200, in other embodiments the described tasks can be performed by other and/or additional components.

FIGS. 6A-6H illustrate an embodiment logic flow for an embodiment MOE 200 operating on a computing device 160 within a synchronization environment 100. While the following discussion is made with respect to systems portrayed herein the operations described may be implemented in other systems. The operations described herein are not limited to the order shown. Additionally, in other alternative embodiments more or fewer operations may be performed. Further, the operations depicted may be performed by an embodiment MOE 200 or by an embodiment MOE 200 in combination with one or more other synchronization environment entities or components.

Figure 6A:
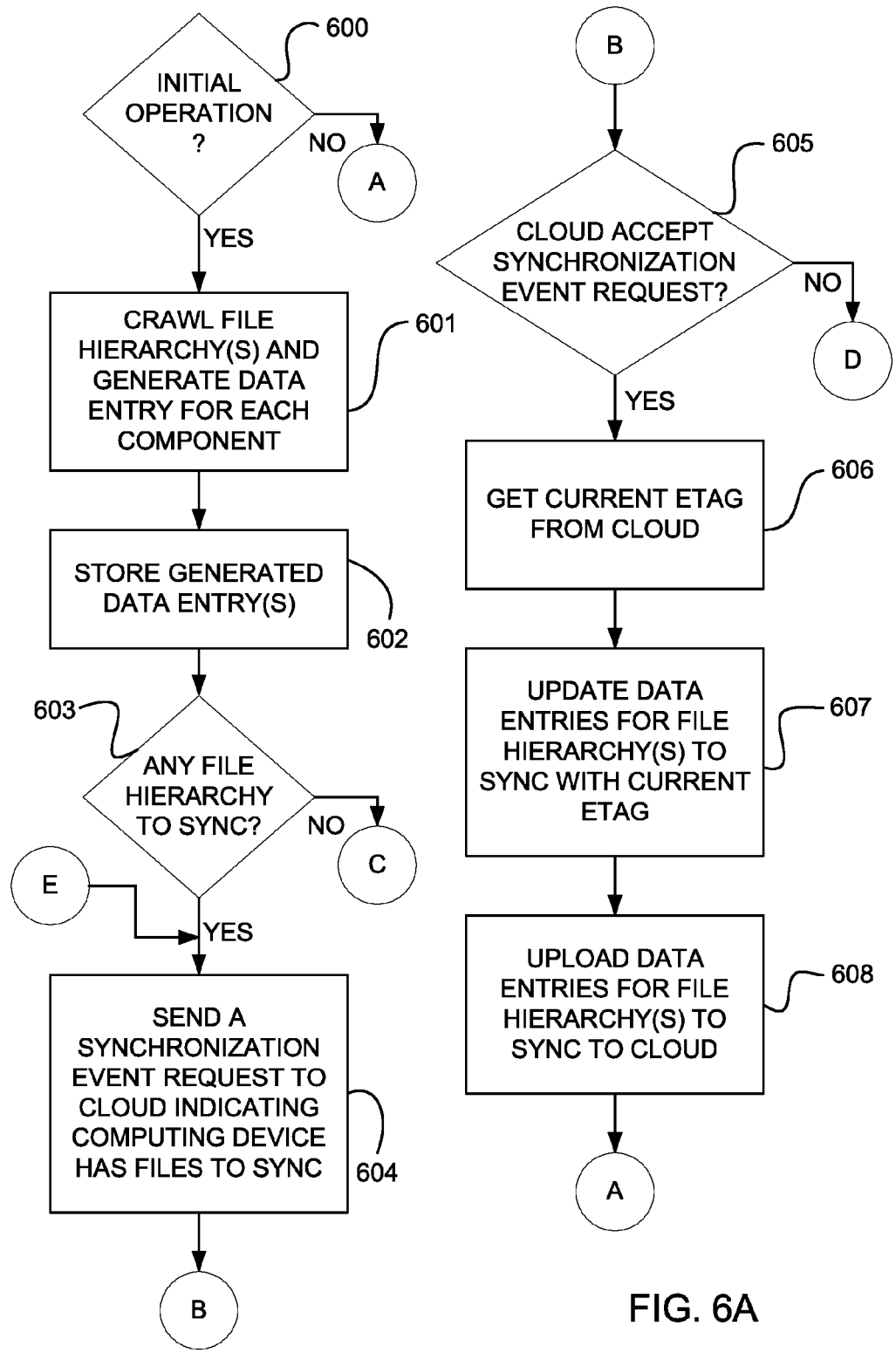
FIGS. 6A-6H illustrate an embodiment logic flow for an embodiment mesh operating environment (MOE).

Referring to FIG. 6A in an embodiment at decision block 600 a determination is made as to whether the MOE is performing an initial synchronization operation for the computing device. If yes, in an embodiment the MOE crawls the file hierarchy(s) on or accessed by the computing device, also referred to herein as the computing device hierarchies, and generates a data entry for each computing device hierarchy component, e.g., each folder and each file, 601. In an alternative embodiment the MOE crawls the file hierarchy(s) on or accessed by the computing device that have been identified by a computing device user and generates a data entry for each file hierarchy component 601.

In an embodiment the MOE stores the generated data entries 602.

In an embodiment at the time the MOE is performing an initial synchronization operation, i.e., at the time the MOE is installed and first begins executing, there may be instances where there are no computing device hierarchies to crawl, and thus steps 601 and 602 will not be performed. Thus, in an embodiment at decision block 603 a determination is made as to whether there are any computing device hierarchies to sync 603. If yes, in an embodiment the MOE sends a synchronization event request to the central node of its computing device's synchronization environment, also referred to hereinafter as the cloud, indicating that the computing device the MOE operates on has data, e.g., folders and files, to sync 604. In an embodiment the synchronization event request includes or otherwise identifies the MOE's current etag.

In an embodiment at decision block 605 a determination is made as to whether the cloud has accepted the synchronization event request. If yes, in an embodiment the MOE gets the cloud's current etag sent by the cloud 606. In an embodiment the MOE updates the data entries for the computing device hierarchies it plans to sync with the cloud with the current cloud etag 607. In an embodiment the MOE uploads the data entries for the computing device hierarchies it wants to sync to the cloud 608.

Figure 6B:
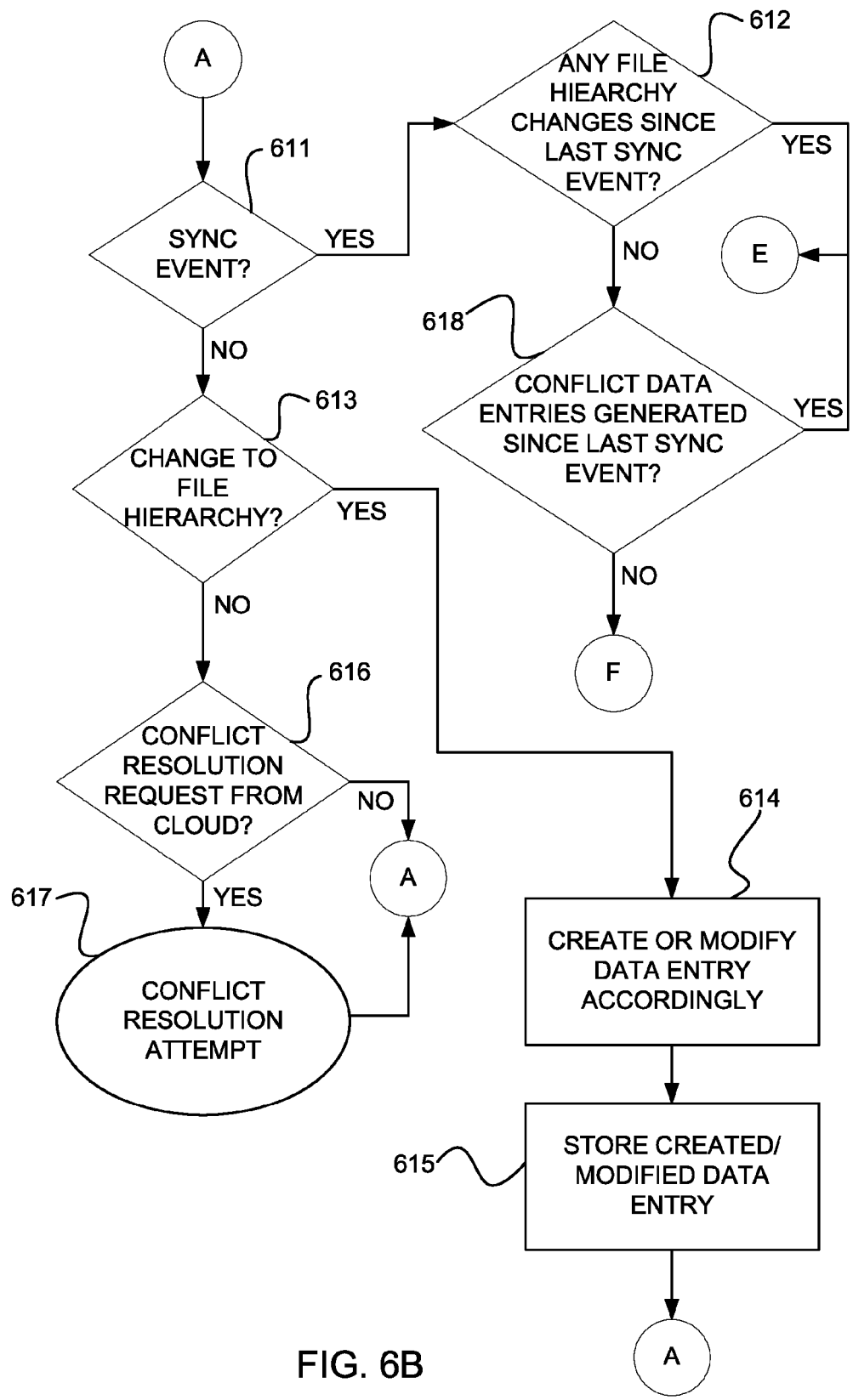

If at decision block 600 the MOE is not performing an initial synchronization operation on the computing device or after uploading data entries for the computing device hierarchies it wants to sync to the cloud 608, in an embodiment and referring to FIG. 6B, at decision block 611 a determination is made as to whether there is a sync event for the computing device the MOE is operating on. In embodiments a sync event can be caused by, e.g., the generation of data on or accessible to the computing device to sync, the generation of one or more conflict data entries, time for the computing device to sync with the cloud, etc. If at decision block 611 there is a sync event, in an embodiment at decision block 612 a determination is made as to whether there have been any changes to any computing device hierarchies that the computing device syncs with the cloud since the last sync event for the computing device; e.g., a modification of an existing file, a deletion of a folder, an addition of a new file, etc. If yes, in an embodiment and referring back to FIG. 6A the MOE sends a synchronization event request to the cloud indicating that the computing device the MOE operates on has data to sync 604.

If at decision block 612 there have been no changes to any computing device hierarchies that the computing device syncs with the cloud since the last sync event then in an embodiment at decision block 618 a determination is made as to whether any conflict data entries have been generated since the last sync event for the computing device. If yes, in an embodiment and referring back to FIG. 6A the MOE sends a synchronization event request to the cloud indicating that the MOE has data entries to upload to the cloud 604.

Figure 6C:
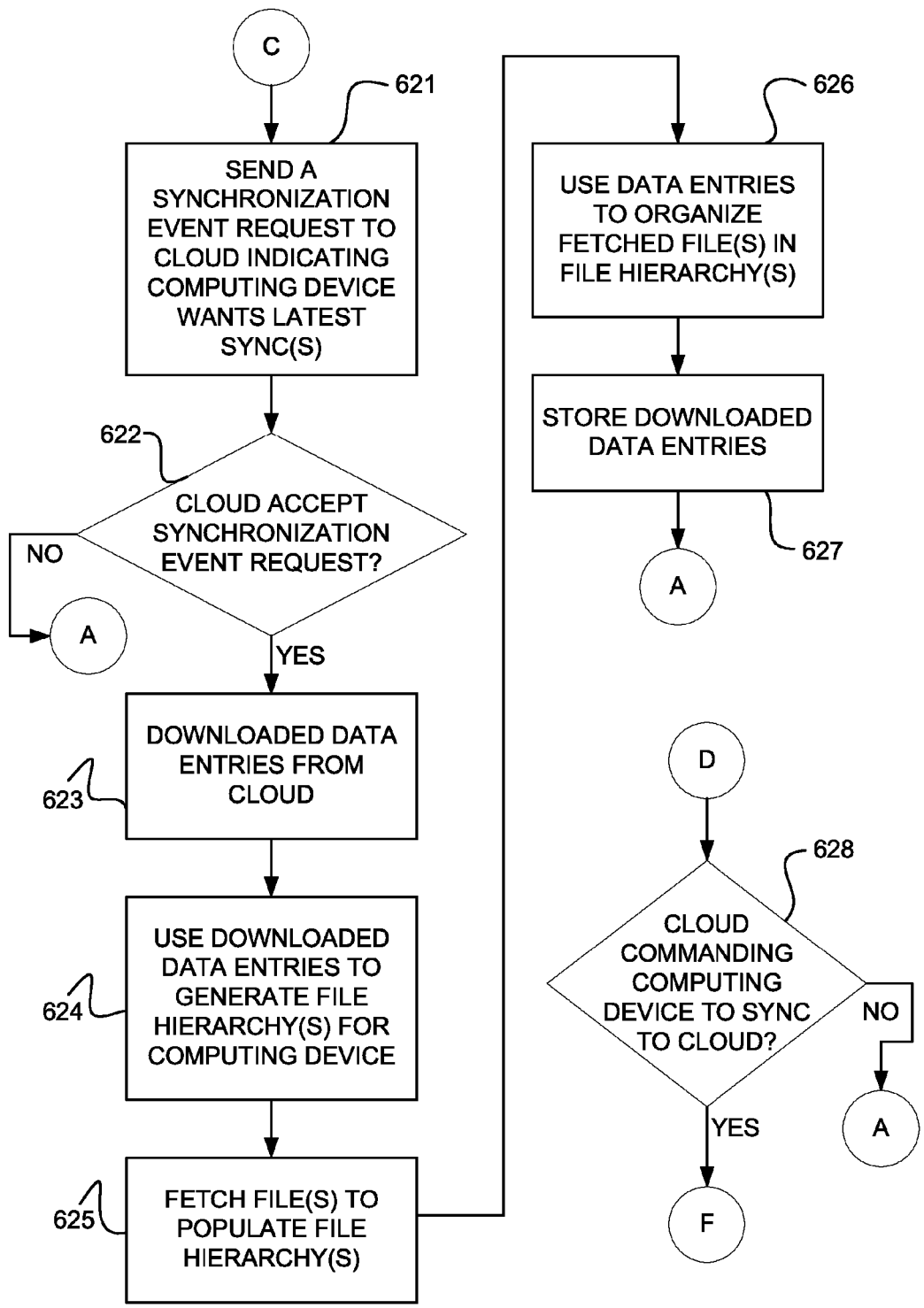

In FIG. 6A at decision block 603, if there are no computing device hierarchies at this initial time then in an embodiment and referring to FIG. 6C the MOE sends a synchronization event request to the cloud indicating that the MOE wishes to sync its computing device with the cloud 621. In an embodiment the synchronization event request includes an initial MOE etag. In an embodiment at decision block 622 a determination is made as to whether the cloud has accepted the current synchronization event request from the MOE. If no, in an embodiment and referring back to FIG. 6B, at decision block 611 a determination is made as to whether there is a sync event for the computing device the MOE is operating on.

If at decision block 622 the cloud has accepted the current synchronization event request from the MOE then in an embodiment the MOE receives data entries downloaded to its computing device from the cloud 623. In an embodiment the MOE receives all the data entries downloaded from the cloud for each etag from the MOE's current etag to the cloud's current etag 623. In an embodiment, if the MOE did not send an etag with, or associated with, its most recent synchronization event request to the cloud, the MOE receives all the data entries downloaded from the cloud that the cloud has for the synchronization environment 623.

In an embodiment the MOE uses the downloaded data entries to generate the corresponding file hierarchy(s) on, or accessible to, the computing device 624. In an embodiment the MOE fetches the file(s) to populate the generated file hierarchy(s) 625. In an embodiment the MOE fetches a file to populate a generated file hierarchy from the computing device that generated the corresponding data entry 625. In an embodiment the MOE fetches a file to populate a generated file hierarchy from the cloud 625.

In an embodiment the MOE uses the downloaded data entries to organize the fetched file(s) in the generated file hierarchy(s) 626. In an embodiment the MOE stores the downloaded data entries 627. In an embodiment and referring again to FIG. 6B, at decision block 611 a determination is made as to whether there is a sync event for the computing device the MOE is operating on.

Referring again to FIG. 6A, if at decision block 605 the cloud did not accept the synchronization event request from the MOE indicating the computing device the MOE operates on has data to sync with the cloud, or conflict data entries to provide the cloud, then in an embodiment and referring to FIG. 6C at decision block 628 a determination is made as to whether the cloud has commanded, or otherwise indicated, that the MOE's computing device is to sync to the cloud. If no, in an embodiment and referring to FIG. 6B at decision block 611 a determination is made as to whether there is a sync event.

Figure 6D:
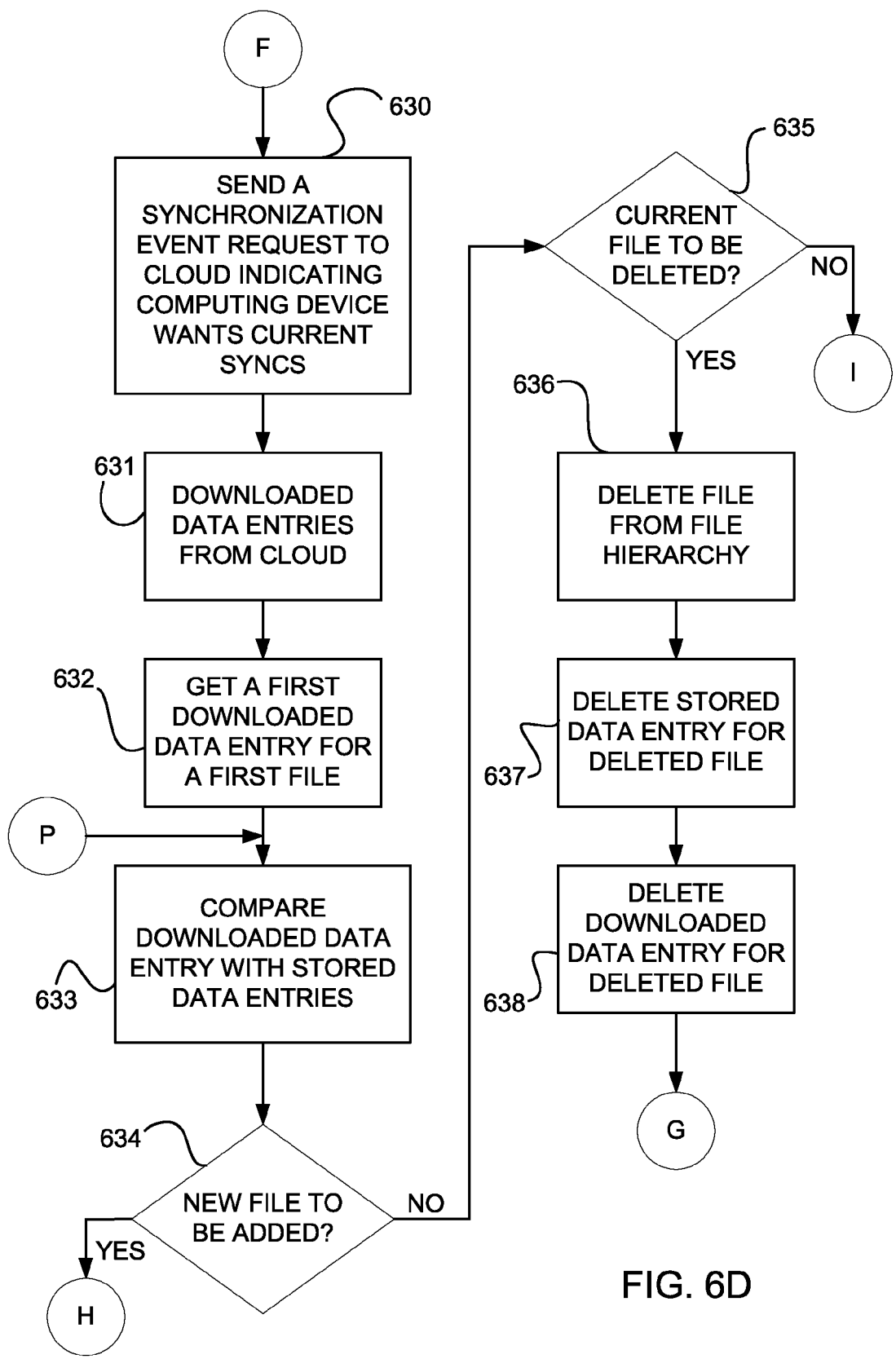

If at decision block 628 of FIG. 6C the cloud has commanded, or otherwise indicated, that the MOE's computing device is to sync to the cloud, or if at decision block 618 of FIG. 6B there are no conflict data entries generated since the last sync event, then in an embodiment and referring to FIG. 6D the MOE sends a synchronization event request to the cloud indicating that the MOE wishes to sync its computing device with the cloud 630. In an embodiment the synchronization event request includes the current MOE etag.

In an embodiment the MOE receives data entries downloaded by the cloud to its computing device 631. In an embodiment the MOE receives all the data entries downloaded from the cloud associated with each etag from the MOE's current etag to the cloud's current etag 631.

In an embodiment the MOE identifies a first downloaded data entry for a first file as the current data entry for processing 632. In an embodiment the MOE compares the current data entry for processing with the data entries stored on, or otherwise accessible to, the computing device, also referred to herein as the stored data entries, 633. In an embodiment at decision block 634 a determination is made as to whether the current data entry for processing indicates a new file is to be added to a computing device hierarchy; e.g., the current data entry for processing has no corresponding stored data entry. If no, in an embodiment at decision block 635 a determination is made as to whether the current data entry for processing is a deletion data entry indicating an existing file for the computing device is to be deleted.

If yes, in an embodiment the MOE deletes the indicated file from its respective computing device hierarchy 636. In an embodiment the MOE deletes the stored data entry for the deleted file 637. In an embodiment the MOE deletes the current data entry for processing that was downloaded from the cloud 638.

Figure 6E:
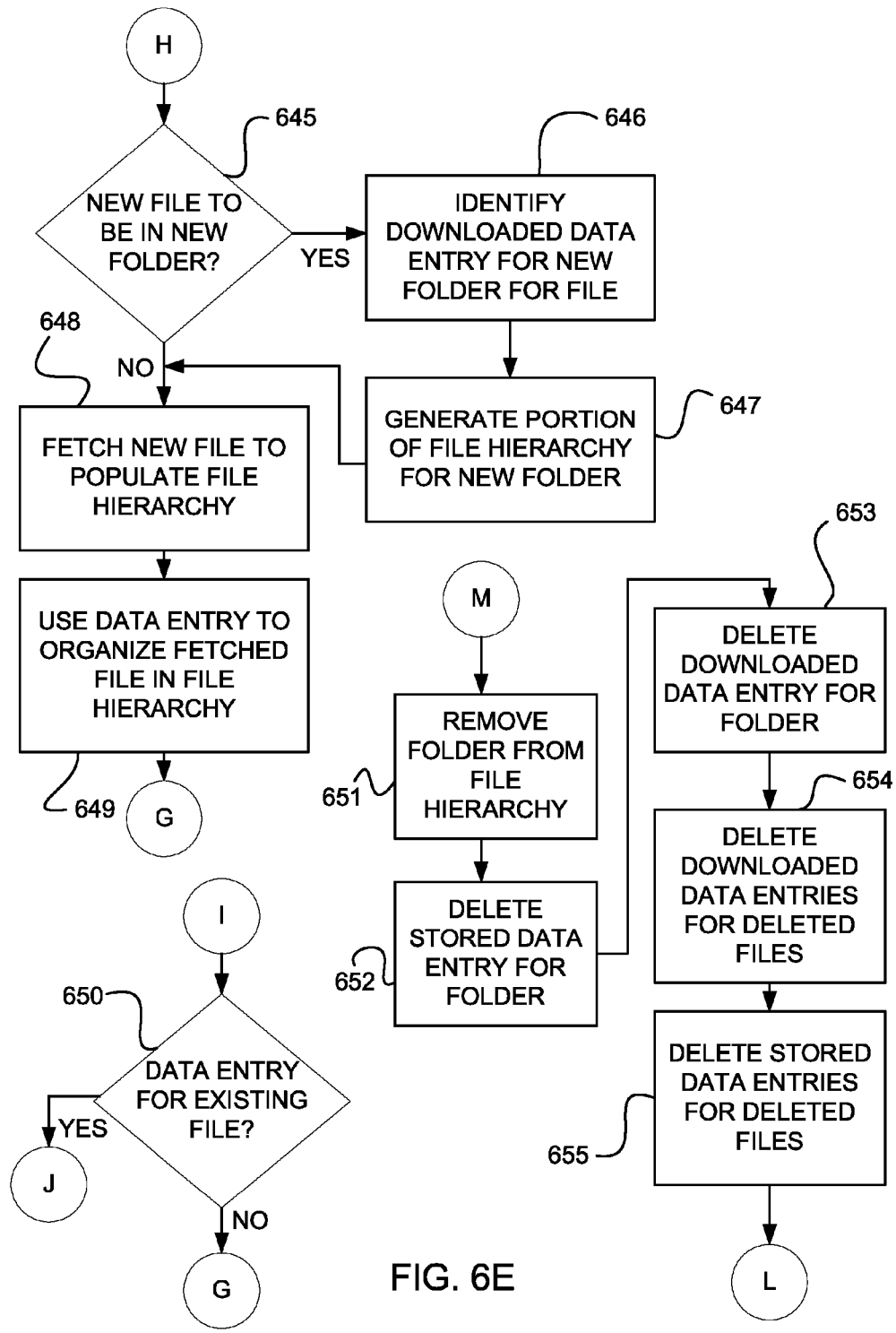
Figure 6F:
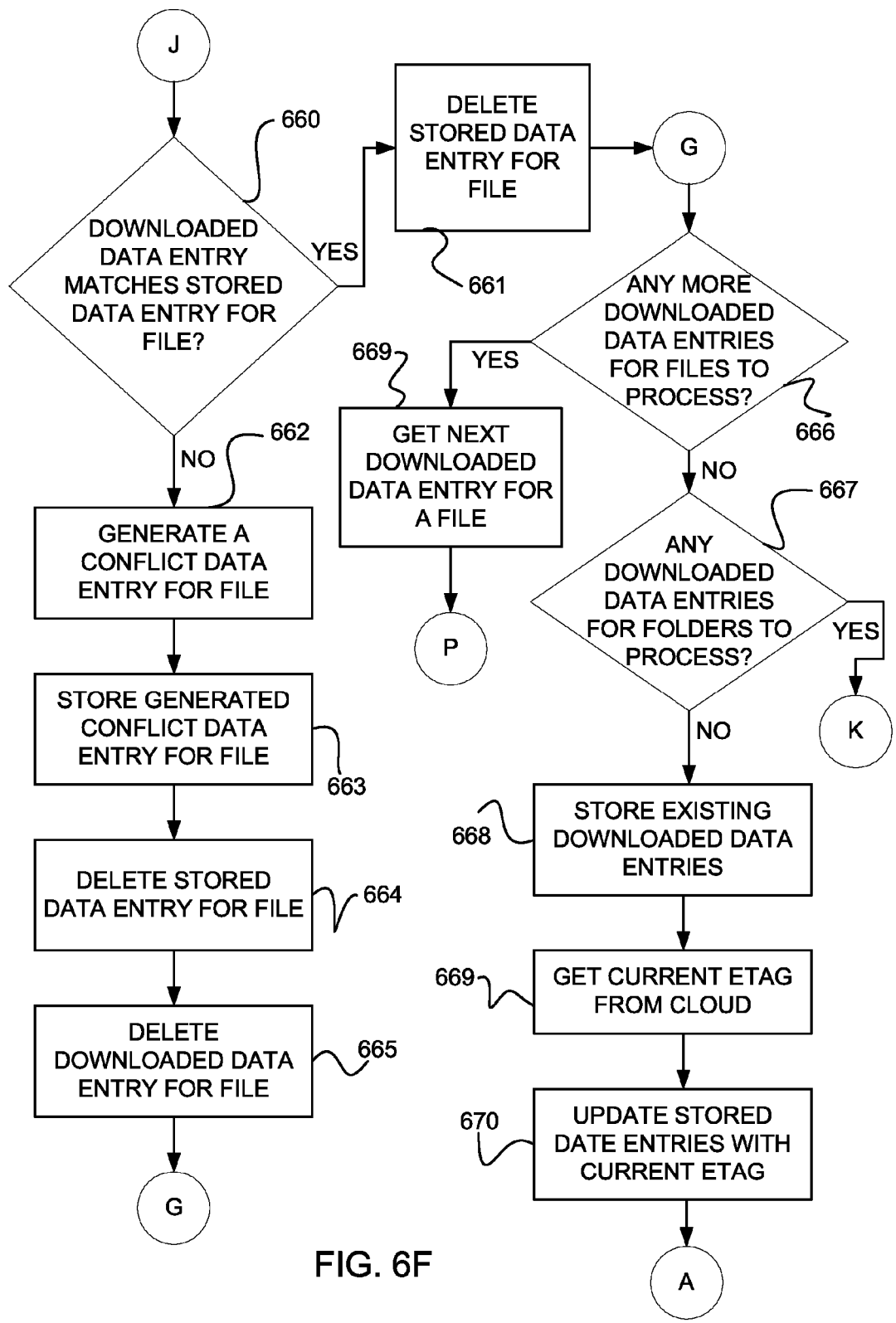

Referring to FIG. 6F, in an embodiment at decision block 666 a determination is made as to whether there are any more data entries received from the cloud for files yet to be processed. If yes, in an embodiment the MOE identifies a next downloaded data entry for a file as the new current data entry for processing 669. In an embodiment and referring to FIG. 6D the MOE compares the new current data entry for processing with the stored data entries 633.

Referring again to FIG. 6F, if at decision block 666 there are no more data entries received from the cloud for files yet to be processed then in an embodiment at decision block 667 a determination is made as to whether there are any received data entries for folders yet to be processed. If no, in an embodiment all received data entries from the cloud have been processed. In an embodiment the MOE stores any existing downloaded data entries 668.

In an embodiment the MOE gets the cloud's current etag sent by the cloud 669. In an embodiment the MOE updates stored data entries with the received cloud's current etag 670. In an embodiment and referring to FIG. 6B at decision block 611 a determination is made as to whether there is a sync event.

Figure 6G:
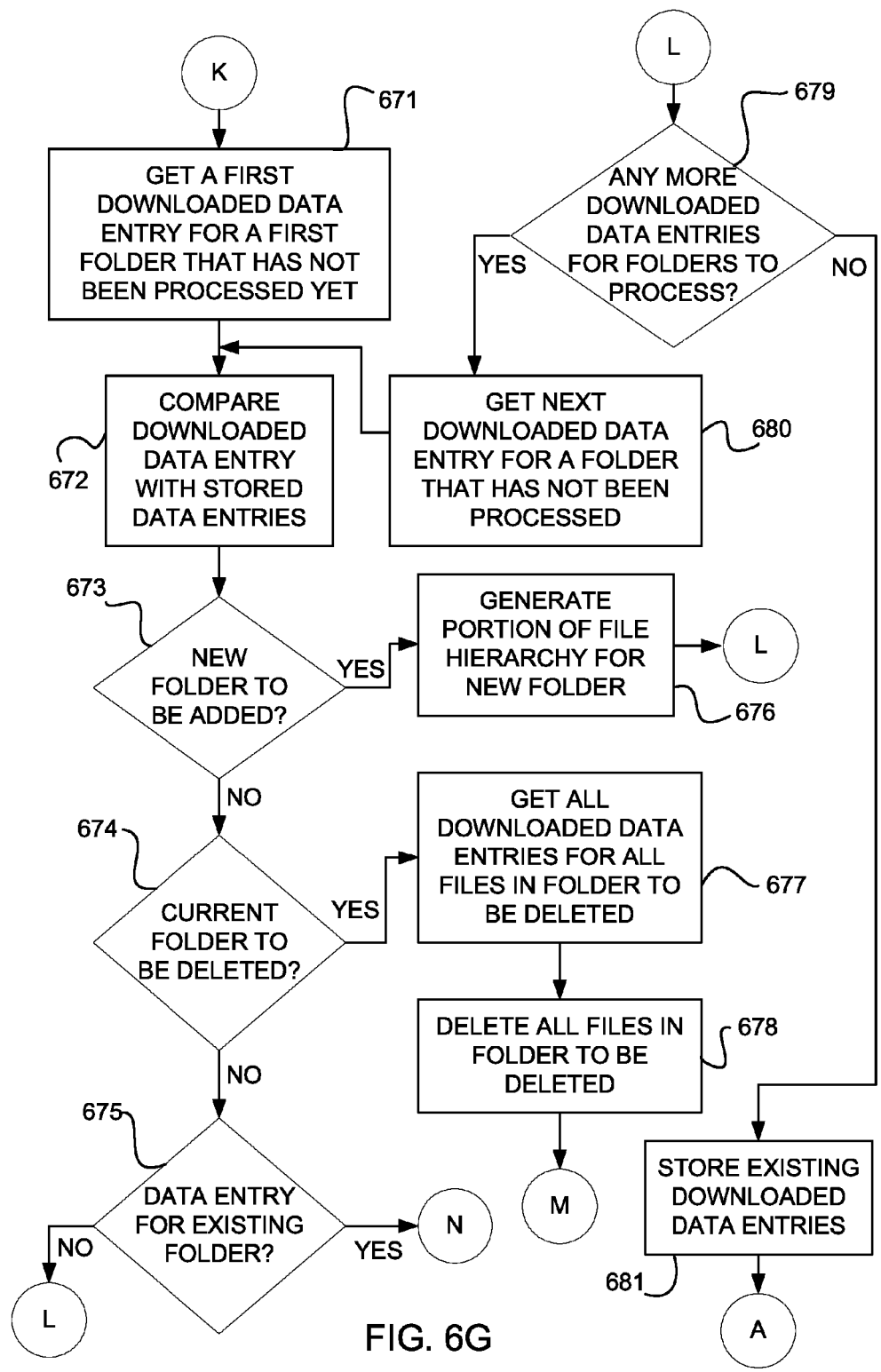

If at decision block 667 of FIG. 6F there is at least one data entry received from the cloud for a folder that is yet to be processed then in an embodiment and referring to FIG. 6G, in an embodiment the MOE identifies a first downloaded data entry for a folder that has yet to be processed as the now current data entry for processing 671. In an embodiment the MOE compares the current data entry for processing with the stored data entries 672.

In an embodiment at decision block 673 a determination is made as to whether the current data entry for processing indicates a new folder is to be added to a computing device hierarchy; e.g., the current data entry for processing has no corresponding stored data entry. If no, in an embodiment at decision block 674 a determination is made as to whether the current data entry for processing is a deletion data entry indicating an existing folder for the computing device is to be deleted. If no, in an embodiment at decision block 675 a determination is made as to whether the current data entry for processing identifies an existing folder for the computing device; e.g., the current data entry for processing is not a deletion data entry and there is a corresponding stored data entry identifying the same folder name in the same folder hierarchy.

If no, in an embodiment at decision block 679 a determination is made as to whether there are any more received data entries for folders yet to be processed. If yes, in an embodiment the MOE identifies a next received data entry for a folder that has yet to be processed as the now current data entry for processing 680.

If at decision block 679 there are no more received data entries for folders yet to be processed then in an embodiment all received data entries from the cloud have been processed. In an embodiment the MOE stores any existing downloaded data entries 681. In an embodiment and referring to FIG. 6B at decision block 611 a determination is made as to whether there is a sync event.

If at decision block 673 the current data entry for processing indicates a new folder is to be added to a computing device hierarchy then in an embodiment the MOE generates the appropriate folder in the identified computing device hierarchy 676. In an embodiment at decision block 679 a determination is made as to whether there are any more received data entries for folders yet to be processed.

At decision block 674, if the current data entry for processing is a deletion data entry for an existing folder then in an embodiment the MOE identifies all the downloaded data entries for all the files in the folder to be deleted 677. In an embodiment the MOE deletes all the files in the folder to be deleted 678. Referring to FIG. 6E in an embodiment the MOE removes the folder to be deleted from the computing device's hierarchy 651. In an embodiment the MOE deletes the stored data entry for the deleted folder 652. In an embodiment the MOE deletes the downloaded data entry for the deleted folder 653. In an embodiment the MOE deletes the downloaded data entries for each of the deleted files that were in the just deleted folder 654. In an embodiment the MOE deletes the stored data entries for each of the deleted files that were in the just deleted folder 655. In an embodiment and referring to FIG. 6G at decision block 679 a determination is made as to whether there are any more received data entries for folders yet to be processed.

Figure 6H:
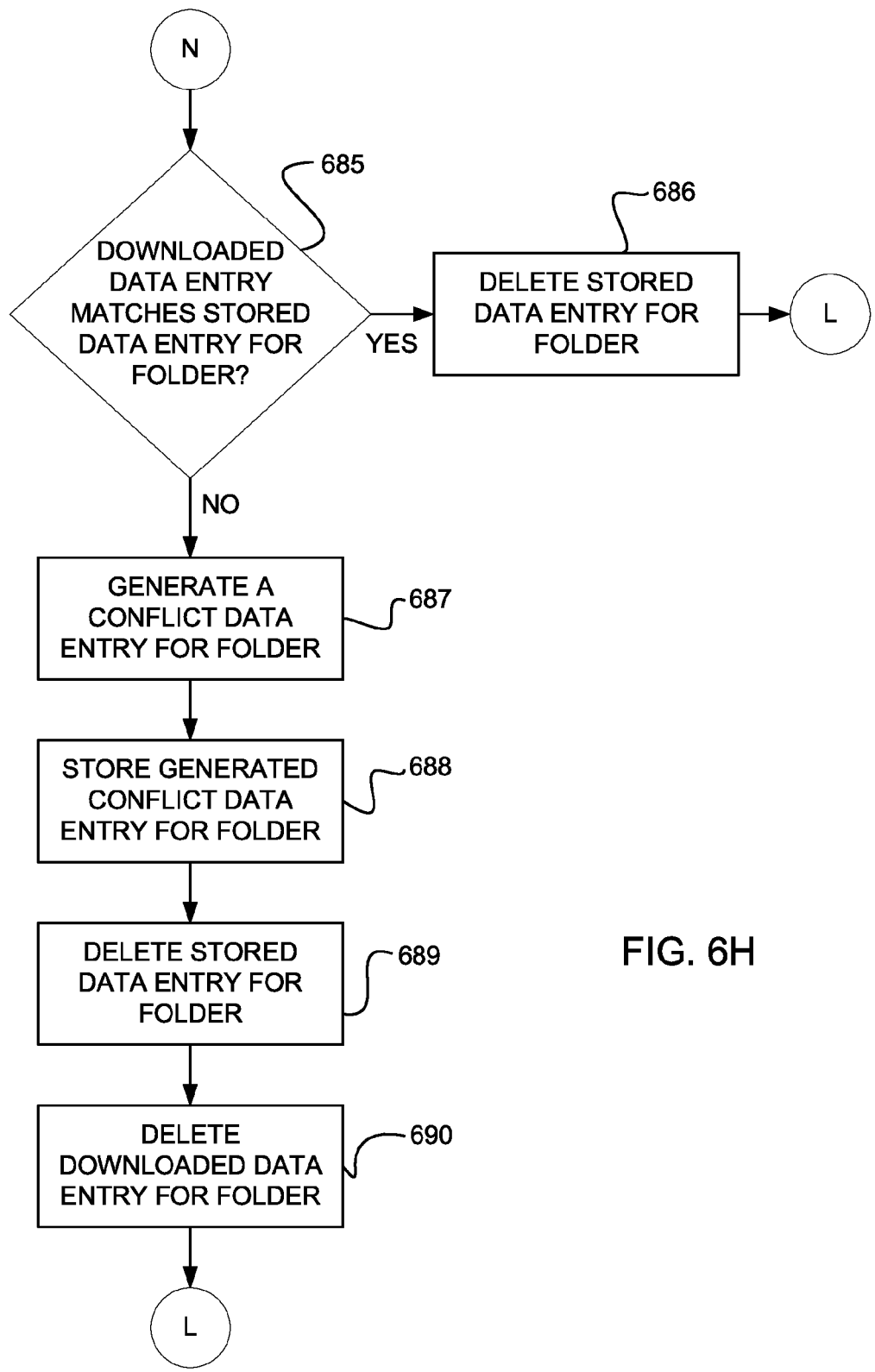

If at decision block 675 of FIG. 6G the current data entry for processing identifies an existing folder for the computing device then in an embodiment and referring to FIG. 6H at decision block 685 a determination is made as to whether the current data entry for processing matches the stored data entry for the same folder name. If yes, i.e., the current data entry for processing that was downloaded from the cloud and the corresponding stored data entry for the same folder name match, identifying the same folder, then in an embodiment the MOE deletes the stored data entry for the folder 686. In this embodiment the MOE operating on the computing device locally and automatically resolves a false conflict that would otherwise be reported as a conflict, or constraint violation. In an embodiment and referring again to FIG. 6G at decision block 679 a determination is made as to whether there are any more received data entries for folders yet to be processed.

At decision block 685 if the current data entry for processing does not match the corresponding stored data entry for a folder with the same name then in an embodiment the MOE generates a conflict data entry for the folder identified in the current data entry for processing 687. In an embodiment the MOE stores the generated conflict data entry 688. In an embodiment the MOE deletes the stored data entry for the folder now identified by the conflict data entry 689. In an embodiment the MOE deletes the current data entry for processing; i.e., the corresponding downloaded data entry from the cloud for the folder, 690. In an embodiment and referring to FIG. 6G at decision block 679 a determination is made as to whether there are any more received data entries for folders yet to be processed.

Referring again to FIG. 6D, if at decision block 634 the current data entry for processing indicates that a new file is to be added to a computing device hierarchy then in an embodiment and referring to FIG. 6E at decision block 645 a determination is made as to whether the new file is to be in a new folder. If yes, in an embodiment the MOE identifies the downloaded data entry for the new folder for the new file 646. In an embodiment the MOE generates the appropriate folder in the identified computing device hierarchy 647. In an embodiment the MOE fetches the new file identified in the current data entry for processing 648. In an embodiment the MOE fetches the new file from the computing device that generated the current data entry for processing 648. In an embodiment the MOE fetches the new file from the cloud 648.

In an embodiment the MOE uses the current data entry for processing to organize the newly fetched file into its folder in the computing device hierarchy 649. In an embodiment and referring to FIG. 6F at decision block 666 a determination is made as to whether there are any more received data entries for files yet to be processed.

Referring to decision block 645 of FIG. 6E, if the new file indicated in the current data entry for processing is not to be added to a new folder, but an existing one for the computing device, then in an embodiment the MOE fetches the new file 648 and uses the current data entry for processing to organize the newly fetched file into its folder 649.

If at decision block 635 of FIG. 6D the current data entry for processing is not a deletion entry for a currently existing file then in an embodiment and referring to FIG. 6E, at decision block 650 a determination is made as to whether the current data entry for processing identifies an existing file for the computing device; e.g., the current data entry for processing is not a deletion data entry and there is a corresponding stored data entry identifying the same file name in the same folder hierarchy. If no, in an embodiment and referring to FIG. 6F at decision block 666 a determination is made as to whether there are any more received data entries for files yet to be processed.

If at decision block 650 of FIG. 6E the current data entry for processing identifies an existing file for the computing device then in an embodiment and referring to FIG. 6F at decision block 660 a determination is made as to whether the current data entry for processing matches the stored data entry for the same file name. If yes, e.g., the current data entry for processing that was downloaded from the cloud and the corresponding stored data entry for the same file name match, identifying the same file, then in an embodiment the MOE deletes the stored data entry for the file 661. In this embodiment the MOE operating on the computing device locally and automatically resolves a false conflict that would otherwise be reported as a conflict, or constraint violation. In an embodiment at decision block 666 a determination is made as to whether there are any more received data entries for files yet to be processed.

At decision block 660 if the current data entry for processing does not match the corresponding stored data entry for a file with the same name then in an embodiment the MOE generates a conflict data entry for the file 662. In an embodiment the MOE stores the generated conflict data entry 663. In an embodiment the MOE deletes the stored data entry for the file now identified by the conflict data entry 664. In an embodiment the MOE deletes the current data entry for processing; i.e., the corresponding downloaded data entry from the cloud for the file, 665. In an embodiment at decision block 666 a determination is made as to whether there are any more received data entries for files yet to be processed.

Referring again to decision block 611 of FIG. 6B, if it is not a sync event for the computing device then in an embodiment at decision block 613 a determination is made as to whether there has been a change made to a computing device hierarchy; e.g., the addition of a file, the deletion of a folder, the modification of a file, etc. If yes, in an embodiment the MOE creates or modifies a data entry accordingly 614. In an embodiment the MOE stores the created or modified data entry 615. In an embodiment at decision block 611 a determination is made as to whether there is a sync event for the computing device the MOE operates on.

If at decision block 613 there has been no change made to a computing device hierarchy then in an embodiment at decision block 616 a determination is made as to whether there is a conflict resolution request from the cloud. If no, in an embodiment at decision block 611 a determination is made as to whether there is a sync event.

If at decision block 616 a conflict resolution request has been received from the cloud then in an embodiment the MOE attempts to resolve the conflict 617. In an embodiment the MOE interacts with a user of the computing device to attempt to resolve the conflict 617. In an embodiment, if the MOE resolves the conflict the MOE generates respective data entries as appropriate 617. In an embodiment, if the MOE resolves the conflict the MOE deletes the conflict data entry associated with the conflict resolution request from the cloud 617. In alternative embodiments the MOE can attempt to resolve the identified conflict in one or more other ways, e.g., by executing statistical analyses and/or predefined algorithms to automatically resolve the conflict and select a file hierarchy component, by exercising a predefined methodology for conflict resolution, e.g., selecting the file hierarchy component with the most current time stamp, etc., etc.

Figure 7:
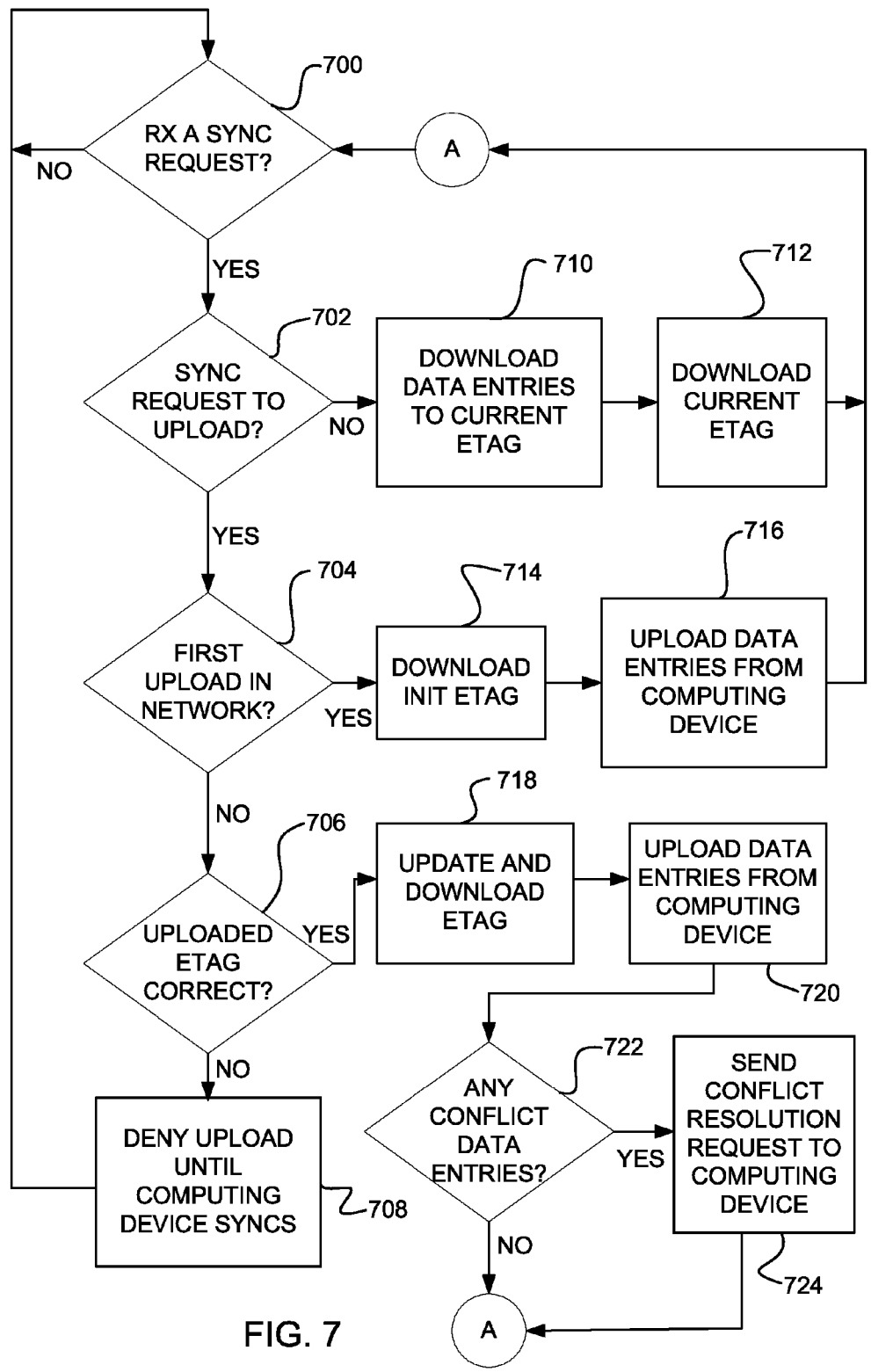
FIG. 7 illustrates an embodiment logic flow for an embodiment central node of an embodiment synchronization environment.

FIG. 7 illustrates an embodiment logic flow for an embodiment cloud 110 operating within a synchronization environment 100 to assist with the synchronization of data, e.g., folders 130 and files 120, among various member computing devices 160 of the synchronization environment 100. While the following discussion is made with respect to systems portrayed herein the operations described may be implemented in other systems. The operations described herein are not limited to the order shown. Additionally, in other alternative embodiments more or fewer operations may be performed. Further, the operations depicted may be performed by an embodiment cloud 110 or by an embodiment cloud 110 in combination with one or more other synchronization environment entities or components.

In an embodiment at decision block 700 a determination is made as to whether the cloud has received a synchronization event request from a computing device. If no, in an embodiment for its synchronization effort the cloud continues to wait for synchronization event request from a computing device 700.

If the cloud does receive a synchronization event request from a computing device then in an embodiment at decision block 702 a determination is made as to whether the synchronization event request is for an upload from a computing device; i.e., whether the computing device is indicating that it has files to sync and/or conflict data entries to send the cloud. If no, then in an embodiment the synchronization event request received by the cloud indicates that the sending computing device wants to sync with the cloud. In an embodiment the cloud downloads the data entries it has associated with the etag values from the etag sent by the computing device to the cloud's current etag 710. In an embodiment the cloud downloads its current etag to the computing device 712. In an embodiment for its synchronization effort the cloud waits for another synchronization event request from a computing device 700.

In an embodiment at decision block 702 if the received synchronization event request is for an upload from a computing device then in an embodiment at decision block 704 a determination is made as to whether this is the first synchronization event request for an upload within the synchronization environment. If yes, in an embodiment the cloud downloads an initial etag, that has been generated by the cloud, to the computing device that sent the synchronization event request 714. In an embodiment the cloud thereafter receives an upload from the computing device of one or more data entries 716. In an embodiment for its synchronization effort the cloud waits for another synchronization event request from a computing device 700.

If at decision block 704 it is not the first synchronization event request for an upload within the synchronization environment then in an embodiment at decision block 706 a determination is made as to whether the etag sent by the computing device matches the cloud's current etag; i.e., whether the computing device is currently in sync with the cloud. If no, in an embodiment the cloud denies the computing device's upload until the computing device syncs with the cloud 708. In an embodiment for its synchronization effort the cloud waits for another synchronization event request from a computing device 700.

If at decision block 706 the uploaded etag from the computing device sending the synchronization event request matches the cloud's etag then in an embodiment the cloud updates its etag to a different value and downloads the updated etag to the computing device 718. In an embodiment the cloud thereafter receives an upload from the computing device of one or more data entries 720. In an embodiment the cloud stores the uploaded data entries and associates each of the stored uploaded data entries with the current updated etag 720.

In an embodiment at decision block 722 a determination is made as to whether any of the most recently uploaded data entries are conflict data entries. If yes, in an embodiment the cloud issues a conflict resolution request for each received conflict data entry to the computing device that uploaded the conflict data entry 724. In an embodiment the cloud also issues a conflict resolution request for each received conflict data entry to each of the other computing devices in the synchronization environment 724.

In an alternative embodiment the cloud issues a conflict resolution request identifying each currently received conflict data entry to the computing device that uploaded the conflict data entries 724. In an alternative embodiment the cloud also issues a conflict resolution request identifying each currently received conflict data entry to each of the other computing devices in the synchronization environment 724.

In an embodiment, whether or not the cloud has received any conflict data entries in the last set of one or more data entries uploaded from a computing device, for its synchronization effort the cloud waits for another synchronization event request from a computing device 700.

Computing Device System Configuration

Figure 8:
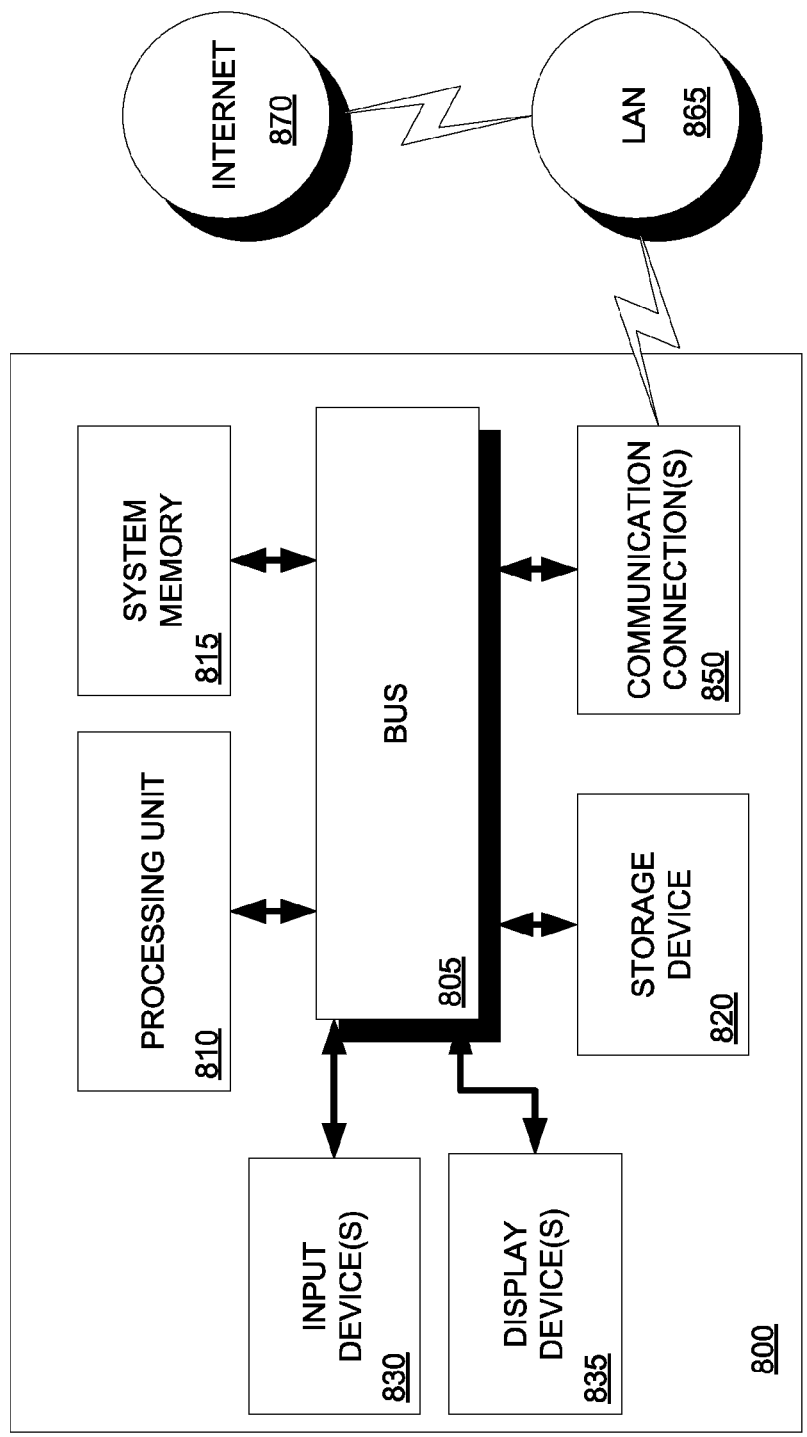
FIG. 8 is a block diagram of an exemplary basic computing device system that can process software, i.e., program code, or instructions.

FIG. 8 is a block diagram that illustrates an exemplary computing device system 800 upon which an embodiment can be implemented. The computing device system 800 includes a bus 805 or other mechanism for communicating information, and a processing unit 810 coupled with the bus 805 for processing information. The computing device system 800 also includes system memory 815, which may be volatile or dynamic, such as random access memory (RAM), non-volatile or static, such as read-only memory (ROM) or flash memory, or some combination of the two. The system memory 815 is coupled to the bus 805 for storing information and instructions to be executed by the processing unit 810, and may also be used for storing temporary variables or other intermediate information during the execution of instructions by the processing unit 810. The system memory 815 often contains an operating system and one or more programs, and may also include program data.

In an embodiment, a storage device 820, such as a magnetic or optical disk, is also coupled to the bus 805 for storing information, including program code consisting of instructions and/or data.

The computing device system 800 generally includes one or more display devices 835, such as, but not limited to, a display screen, e.g., a cathode ray tube (CRT) or liquid crystal display (LCD), a printer, and one or more speakers, for providing information to a computing device user. The computing device system 800 also generally includes one or more input devices 830, such as, but not limited to, a keyboard, mouse, trackball, pen, voice input device(s), and touch input devices, which a computing device user can use to communicate information and command selections to the processing unit 810. All of these devices are known in the art and need not be discussed at length here.

The processing unit 810 executes one or more sequences of one or more program instructions contained in the system memory 815. These instructions may be read into the system memory 815 from another computing device-readable medium, including, but not limited to, the storage device 820. In alternative embodiments, hard-wired circuitry may be used in place of or in combination with software program instructions. The computing device system environment is not limited to any specific combination of hardware circuitry and/or software.

The term "computing device-readable medium" as used herein refers to any medium that can participate in providing program instructions to the processing unit 810 for execution. Such a medium may take many forms, including but not limited to, storage media and transmission media. Examples of storage media include, but are not limited to, RAM, ROM, EEPROM, flash memory, CD-ROM, digital versatile disks (DVD), magnetic cassettes, magnetic tape, magnetic disk storage, or any other magnetic medium, floppy disks, flexible disks, punch cards, paper tape, or any other physical medium with patterns of holes, memory chip, or cartridge. The system memory 815 and storage device 820 of the computing device system 800 are further examples of storage media. Examples of transmission media include, but are not limited to, wired media such as coaxial cable(s), copper wire and optical fiber, and wireless media such as optic signals, acoustic signals, RF signals and infrared signals.

The computing device system 800 also includes one or more communication connections 850 coupled to the bus 805. The communication connection(s) 850 provide a two-way data communication coupling from the computing device system 800 to other computing devices on a local area network (LAN) 865 and/or wide area network (WAN), including the World Wide Web, or Internet 870. Examples of the communication connection(s) 850 include, but are not limited to, an integrated services digital network (ISDN) card, modem, LAN card, and any device capable of sending and receiving electrical, electromagnetic, optical, acoustic, RF or infrared signals.

Communications received by the computing device system 800 can include program instructions and program data. The program instructions received by the computing device system 800 may be executed by the processing unit 810 as they are received, and/or stored in the storage device 820 or other non-volatile storage for later execution.

Conclusion

While various embodiments are described herein, these embodiments have been presented by way of example only and are not intended to limit the scope of the claimed subject matter. Many variations are possible which remain within the scope of the following claims. Such variations are clear after inspection of the specification, drawings and claims herein. Accordingly, the breadth and scope of the claimed subject matter is not to be restricted except as defined with the following claims and their equivalents.

What is claimed is:

1. A method performed on a computing device that is a member of a multiple computing device endpoint environment that comprises a master and that further comprises a constraint, the method comprising:
    creating, by the computing device, a data entry for each file in a file hierarchy;
    storing each created data entry as a stored data entry;
    issuing, by the computing device, a synchronization event request to the master, where the synchronization event request has an associated etag value;
    receiving a downloaded data entry from the master that was generated on another computing device in the multiple computing device endpoint environment;
    identifying the downloaded data entry as a currently-processing data entry;
    identifying a stored data entry that matches the currently-processing data entry, where the matching stored data entry and currently-processing data entry indicate a conflict that is a violation of the constraint;
    determining that the conflict is a false conflict;
    resolving the false conflict;
    receiving an indication from the master that the synchronization event request is denied;
    receiving an updated etag value from the master;
    modifying each stored data entry for the computing device to comprise the updated etag value, wherein each stored data entry for the computing device comprises an etag field;
    issuing a second synchronization event request to the master, wherein the second synchronization event request identifies the updated etag value, and wherein the second synchronization event request notifies the master that the computing device has at least one data entry to upload to the master; and
    uploading at least one stored data entry modified to comprise the updated etag value to the master.

2. The method of claim 1, wherein the master is a cloud.

3. The method of claim 1, further comprising:
    crawling the file system, where the crawling comprises searching for and identifying files in the file hierarchy stored for the computing device; and
    creating a data entry for each folder in the file hierarchy.

4. The method of claim 1, wherein the constraint comprises a rule that there may be only one data entry for a file of the file hierarchy that is synchronized within the multiple computing device endpoint environment.

5. The method of claim 4, wherein each data entry for a file in the multiple computing device endpoint environment comprises a name field value, a sync id field value, a path field value, and an etag field value.

6. The method of claim 5, where the matched stored data entry and the matched currently-processing data entry each comprise a matching name field value and a matching path field value.

7. The method of claim 1, where the resolving comprises deleting one of the matched stored data entry and the matched currently-processing data entry.

8. The method of claim 1, further comprising:
fetching a file identified by a downloaded data entry;
identifying, based on the downloaded data entry, a correct file hierarchy location for the fetched file; and
storing the fetched file in its correct file hierarchy location.

9. The method of claim 1, further comprising:
identifying a second downloaded data entry as a new currently-processing data entry;
identifying a second stored data entry that matches the new currently-processing data entry, where the matching stored data entry and new currently-processing data entry indicate a second conflict that is a second violation of the constraint;
determining that the second conflict is a second true conflict;
creating a conflict data entry; and
uploading the conflict data entry to the master.

10. The method of claim 9, further comprising storing the created conflict data entry, where the conflict data entry comprises a conflict identification field value, a first name field value comprising the value of a name field of the second stored data entry, where the value of the name field of the second stored data entry identifies the name of the file that the second stored data entry was created for, a second name field value comprising the value of a name field of the new currently-processing data entry, where the value of the name field of the new currently-processing data entry identifies the name of the file that the new currently-processing data entry was created for, and where the first name field value and the second name field value match.

11. The method of claim 9, further comprising:
deleting the second stored data entry; and
deleting the new currently-processing data entry.

12. At least one storage device storing instructions that, when executed by a computing device, causes the computing device to perform actions, where the computing device is a member of a multiple computing device endpoint environment that comprises a master and that further comprises a constraint, the actions comprising:
creating, by the computing device, a data entry for each file in a file hierarchy;
storing each created data entry as a stored data entry;
issuing, by the computing device, a synchronization event request to the master, where the synchronization event request has an associated etag value;
receiving a downloaded data entry from the master that was generated on another computing device in the multiple computing device endpoint environment;
identifying the downloaded data entry as a currently-processing data entry;
identifying a stored data entry that matches the currently-processing data entry, where the matching stored data entry and currently-processing data entry indicate a conflict that is a violation of the constraint;
determining that the conflict is a false conflict;
resolving the false conflict;
receiving an indication from the master that the synchronization event request is denied;
receiving an updated etag value from the master;
modifying each stored data entry to comprise the updated etag value;
issuing a second synchronization event request to the master, where the second synchronization event request identifies the updated etag value, and where the second synchronization event request notifies the master that the computing device has at least one data entry to upload to the master; and
uploading at least one stored data entry modified to comprise the updated etag value to the master.

13. The at least one storage device of claim 12 where the downloaded data entry was generated on another computing device in the multiple computing device endpoint environment.

14. The at least one storage device of claim 12 where the conflict indicates that there are two files with a same name in a same folder of the file hierarchy.

15. The at least one storage device of claim 12 where the resolving comprises deleting one of the matched stored data entry and the matched currently-processing data entry.

16. A system comprising a computing device and at least one program that are together configured for performing actions, where the computing device is a member of a multiple computing device endpoint environment that comprises a master and that further comprises a constraint, the actions comprising:
creating, by the computing device, a data entry for each file in a file hierarchy;
storing each created data entry as a stored data entry;
issuing, by the computing device, a synchronization event request to the master, where the synchronization event request has an associated etag value;
receiving a downloaded data entry from the master that was generated on another computing device in the multiple computing device endpoint environment;
identifying the downloaded data entry as a currently-processing data entry;
identifying a stored data entry that matches the currently-processing data entry, where the matching stored data entry and currently-processing data entry indicate a conflict that is a violation of the constraint;
determining that the conflict is a false conflict;
resolving the false conflict;
receiving an indication from the master that the synchronization event request is denied;
receiving an updated etag value from the master;
modifying each stored data entry to comprise the updated etag value;
issuing a second synchronization event request to the master, where the second synchronization event request identifies the updated etag value, and where the second synchronization event request notifies the master that the computing device has at least one data entry to upload to the master; and
uploading at least one stored data entry modified to comprise the updated etag value to the master.

17. The system of claim 16 where the downloaded data entry was generated on another computing device in the multiple computing device endpoint environment.

18. The system of claim 16 where the conflict indicates that there are two files with a same name in a same folder of the file hierarchy.

19. The system of claim 16 where the resolving comprises deleting one of the matched stored data entry and the matched currently-processing data entry.

* * * * *